United States Patent
Robbins et al.

(10) Patent No.: US 12,401,664 B2
(45) Date of Patent: Aug. 26, 2025

(54) SYSTEM AND METHOD FOR CONTINUOUS COLLECTION, ANALYSIS AND REPORTING OF ATTACK PATHS CHOKE POINTS IN A DIRECTORY SERVICES ENVIRONMENT

(71) Applicant: Specter Ops, Inc., Alexandria, VA (US)

(72) Inventors: Andrew Robbins, Alexandria, VA (US); Rohan Vazarkar, Alexandria, VA (US); John Hopper, Alexandria, VA (US)

(73) Assignee: Specter Ops, Inc.

( * ) Notice: Subject to any disclaimer, the term of this patent is extended or adjusted under 35 U.S.C. 154(b) by 218 days.

(21) Appl. No.: 17/989,591

(22) Filed: Nov. 17, 2022

(65) Prior Publication Data

US 2023/0078044 A1    Mar. 16, 2023

Related U.S. Application Data

(63) Continuation-in-part of application No. 17/473,370, filed on Sep. 13, 2021, now Pat. No. 11,539,725, which is a continuation-in-part of application No. 17/144,789, filed on Jan. 8, 2021, now Pat. No. 11,032,298, which is a continuation of application No. 16/857,039, filed on Apr. 23, 2020, now abandoned.

(51) Int. Cl.
  *H04L 9/40*     (2022.01)
  *G06F 16/21*    (2019.01)

(52) U.S. Cl.
  CPC ........ *H04L 63/1416* (2013.01); *G06F 16/212* (2019.01)

(58) Field of Classification Search
  None
  See application file for complete search history.

(56) References Cited

U.S. PATENT DOCUMENTS

| | | | |
|---|---|---|---|
| 6,574,737 B1 | 6/2003 | Kingsford et al. |
| 9,100,430 B1 | 8/2015 | Seiver et al. |
| 11,032,298 B1 | 6/2021 | Robbins et al. |
| 11,159,556 B2 | 10/2021 | Gerber, Jr. |
| 11,170,334 B1 | 11/2021 | Orzechowski et al. |
| 11,184,385 B2 | 11/2021 | Hadar et al. |
| 2006/0021046 A1 | 1/2006 | Cook |
| 2013/0347116 A1 | 12/2013 | Flores et al. |
| 2015/0172309 A1 | 6/2015 | Zandani et al. |
| 2016/0088000 A1 | 3/2016 | Siva Kumar et al. |
| 2017/0093910 A1 | 3/2017 | Gukal et al. |
| 2017/0302685 A1 | 10/2017 | Ladnai et al. |
| 2017/0302691 A1 | 10/2017 | Singh et al. |
| 2018/0316704 A1 | 11/2018 | Joseph Durairaj et al. |
| 2019/0124104 A1 | 4/2019 | Apostolopoulos |

(Continued)

OTHER PUBLICATIONS

"Active Directory Administrative Tier Model," Microsoft Docs, Securing Privileged Access Reference Material, Feb. 14, 2019, 32 pages, Retrieved from URL: https://docs.microsoft.com/en-us/windows-server/identity/securing-privileged-access/securing-privileged-access-reference-material.

(Continued)

*Primary Examiner* — Christopher C Harris
(74) *Attorney, Agent, or Firm* — DLA PIPER LLP (US); Blake W. Jackson

(57) ABSTRACT

A system and method for analyzing directory service environment attack path choke points for an enterprise may continuously collect data about the attack paths and provide alerts.

8 Claims, 28 Drawing Sheets

(56) References Cited

U.S. PATENT DOCUMENTS

| | | |
|---|---|---|
| 2019/0334928 A1 | 10/2019 | Sela et al. |
| 2020/0356664 A1 | 11/2020 | Maor |
| 2020/0358805 A1 | 11/2020 | Segal et al. |
| 2020/0396240 A1 | 12/2020 | Flaherty et al. |
| 2021/0021629 A1 | 1/2021 | Dani et al. |
| 2021/0099490 A1 | 4/2021 | Crabtree et al. |
| 2021/0110047 A1 | 4/2021 | Fang |
| 2021/0336971 A1 | 10/2021 | Robbins et al. |

OTHER PUBLICATIONS

"GitHub-BloodHoundAD/BloodHound: Six Degrees of Domain Admin," Apr. 23, 2020, 2 Pages, Retrieved from URL: https://github.com/BloodHoundAD/BloodHound.

700

(Continuous loop)

For When:

Attack Path Edge is discovered which connects Tier 0 Node to any non-Tier 0 Node:

Post to Alert API and send alert, include:

- Description

- Impacted Objects

- Recommended Remediation

FIGURE 7A

SYSTEM AND METHOD FOR CONTINUOUS COLLECTION, ANALYSIS AND REPORTING OF ATTACK PATHS CHOKE POINTS IN A DIRECTORY SERVICES ENVIRONMENT

PRIORITY CLAIMS/RELATED APPLICATIONS

This application is a continuation-in-part and claims priority to U.S. patent application Ser. No. 17/473,370 filed Sep. 13, 2021 which in turn claims priority as a continuation-in-part to U.S. patent application Ser. No. 17/144,789 filed Jan. 8, 2021 that is a continuation of and claims priority to U.S. patent application Ser. No. 16/857,039 filed Apr. 23, 2020 and entitled "System and Method for Continuous Collection, Analysis and Reporting of Attack Paths in a Directory Services Environment", the entirety of which are incorporated herein by reference.

APPENDICES

Appendix A (20 pages) contains an example of user data collected by the attack path determining system and method, an example of computer data collected by the attack path determining system and method; an example of group data collected by the attack path determining system and method, an example of domain data collected by the attack path determining system and method, an example of group policy object data collected by the attack path determining system and method and an example of organizational unit data collected by the attack path determining system and method. Appendix A forms part of the specification and incorporated herein.

FIELD

The disclosure relates generally to a system and method for determining attack paths in an enterprise system and in particular to a system and method for collecting, analyzing the reporting attack paths choke points in a directory services environment.

BACKGROUND

Enterprise security teams use Directory Services solutions to manage permissions and access to networked resources. These teams are responsible with ensuring the right assets (users, groups of users, and computers) have just enough access to other assets within the network to complete their job duties but no more. This is critical for two reasons: 1) excessive permissions open paths for malicious actors to operate and execute (that may be known as "Attack Paths") in the pursuit of their objective once gaining initial access within the environment; and 2) excessive permissions increase insider threat risk from users with unnecessary access to sensitive data.

One challenge with Directory Services is the cascading permissions that can be granted to an asset either through nested permissions either directly or indirectly by associating it with another Directory Services asset. This introduces a "Russian Doll" effect of nested permissions that can excessively expose assets within the environment.

Another challenge with Directory Services is the manner in which user credentials or access tokens are stored after accessing other assets within the network. Harvesting, misusing, or hijacking these credentials and tokens (that may be known as "Credential Theft") is trivial for malicious actors who use these to continue to execute lateral movement and complete their objectives.

No solution designed to analyze permissions in Directory Services uses both analysis of token risk with un-nested asset permissions in the calculation of all possible Attack Paths. This leads to a partial and incorrect picture of exposure risk for the environment. Additionally, no system today analyzes all possible Attack Paths in a continuous basis because current solutions focus on point-in-time scans only. The total number of Attack Paths is in a constant state of flux due to daily changes to Directory Services assets (e.g. users added to new groups leading to new nested permissions) and users logging in to other network resources (new Credential Theft risk). Continuous analysis facilitates alerting on an increase in the number of Attack Paths that expose critical assets to compromise.

Finally, no system today presents findings and recommendations from a Tiering Isolation viewpoint. Tiering Isolation is a security and administrative best practice for the management of Directory Services infrastructure. Systems in place today overload administrative and security personnel with generic alerting which do not focus on reducing the total Attack Paths connecting tiered enterprise assets. Proper segmentation of privilege through Tiering Isolation effective cuts the Attack Paths available for compromise and dramatically hardens the network against attackers.

Currently, there is an open source program publicly available from the assignee of the present application called "BloodHound Free and Open-Source" ("BloodHound FOSS") (publicly accessible and available at github.com/BloodHoundAD/BloodHound). BloodHound FOSS is a tool used by ethical hacking professionals who conduct penetration testing or red team operations against corporate client networks. These engagements are designed to emulate attacker activities and complete one or more target objectives to test the security of the environment.

BloodHound FOSS is built to identify a path to a target objective to an authorized ethical hacker. This user will execute BloodHound FOSS to map the available Attack Paths from a computer under his or her control. Once the Attack Graph is populated, the user chooses an Attack Path to pursue and conducts follow-on activities in the pursuit of their target objective. While BloodHound FOSS can identify the available Attack Paths utilizing analysis of both nested relationships and Credential Theft, it does so only from the viewpoint of a single system, is executed as a point-in-time snapshot versus continuous collection and analysis. BloodHound FOSS also is unable to aggregate data collected from multiple sources in an automated manner. BloodHound FOSS only provides the options for users to execute to move to a target objective, it does not provide detailed descriptions of the underlying objects or provide recommendations for defensive mitigation or remediation strategies.

For a large network of an entity, there may be an impossibly large number of attack paths wherein each attack path is a possible way to exploit weaknesses in the Directory Services system that manages access permissions for the entity. It is not feasible to be able to secure each of these Directory Services attack paths which is a technical problem with currently known techniques and systems. It is desirable to be able to filter out some of the attack paths and focus on the key attack paths that are most likely to result in exploits that is not currently provided by the above described existing systems and methods and it is to this end that the disclosure is directed.

BRIEF DESCRIPTION OF THE DRAWINGS

FIGS. 7A and 7B illustrate examples of a rule (implemented in pseudocode) of the alert and the alert user interface, respectively, generated by the alerting engine of the system;

DETAILED DESCRIPTION OF ONE OR MORE EMBODIMENTS

The disclosure is particularly applicable to an enterprise system and method for identifying one or more attack path choke points in a Directory Services system, such as Microsoft® Active Directory (AD) directory services environment with traditional IT components, and it is in this context that the disclosure will be described. It will be appreciated, however, that the system and method has greater utility, such as other Directory Services and or Identity and Access Management (IAM) infrastructures that might have slightly different architectures and/or different or additional IT components all of which are within the scope of this disclosure. For example, the system and method may be used to detect attack paths with any network using any operating system and any directory services system such as Azure Active Directory and Amazon Web Services (AWS) IAM.

The attack paths in a Directory Services system are like roads that lead into a location like the island of Manhattan in New York and it is desirable to protect Manhattan from an attack. However, there are far too many roads throughout the United States that can be navigated to get to Manhattan (and thus launch an attack) and it would be impossible to secure each of these roads against attackers. Similarly, there may be a huge number of Directory Services attack paths in any large computer network. It is desirable to be able to reduce the number of roads/attack paths that need to be secured.

Figure 1:
FIG. 1 is a map of Manhattan that shows the routes into Manhattan.

In the Manhattan example, Manhattan is an island and therefore any attack must get onto the island via a road. Thus, it is far simpler to focus on the bridges and other routes into the island of Manhattan as shown in FIG. 1. However, for Manhattan there are still too many routes into Manhattan (bridges, tunnels, etc.) so that it is necessary to further focus the efforts to secure the routes into Manhattan. One way to focus the effort may be to measure the number of people that use each route and then prioritize the route(s) that provides access to the largest number of people and secure those route(s). These route(s) can be thought of as "choke points" since securing those choke points provides the greatest reduction to the threats.

Figure 2:
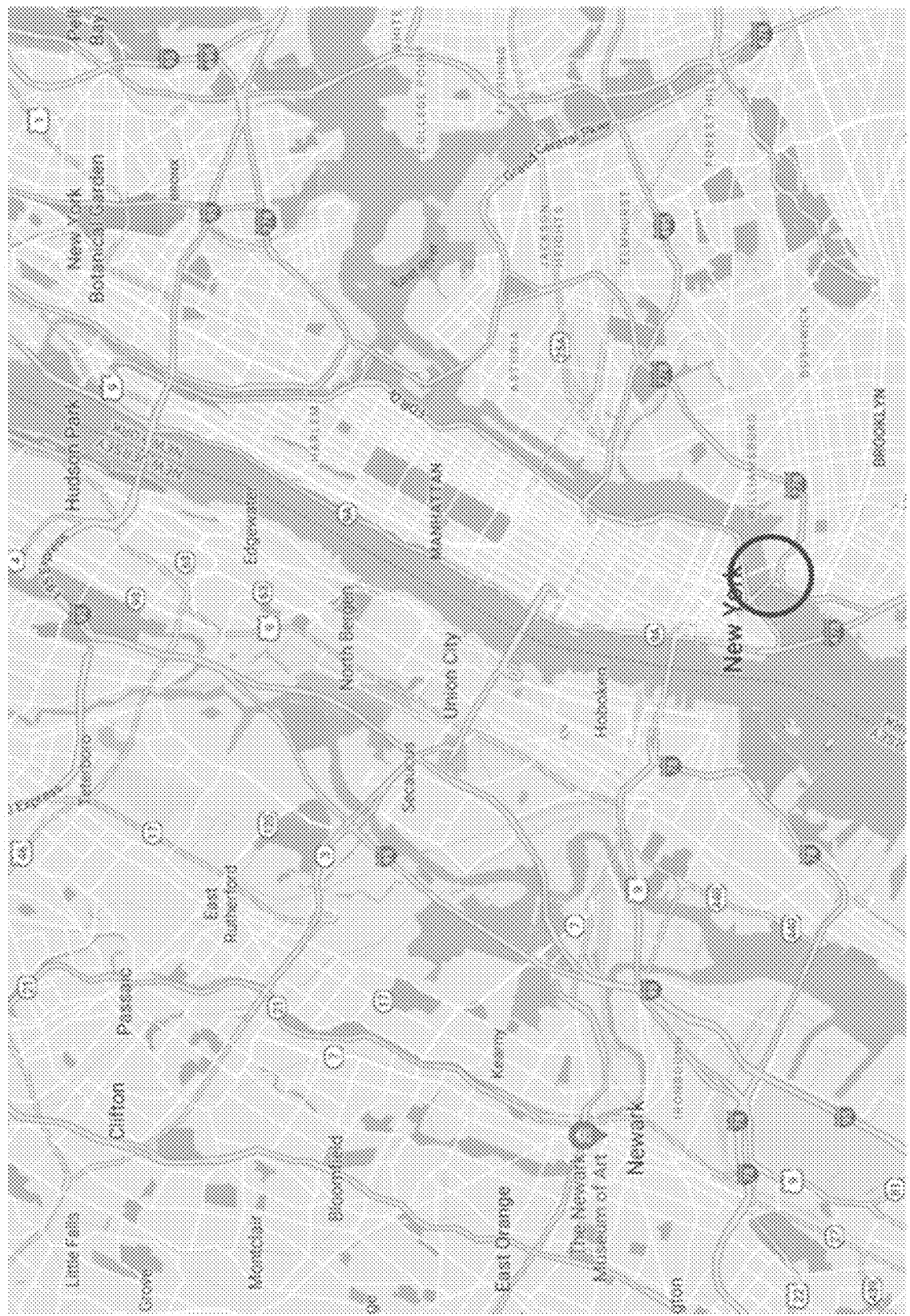
FIG. 2 is a map of Manhattan highlighting the Brooklyn bridge.
Figure 3:
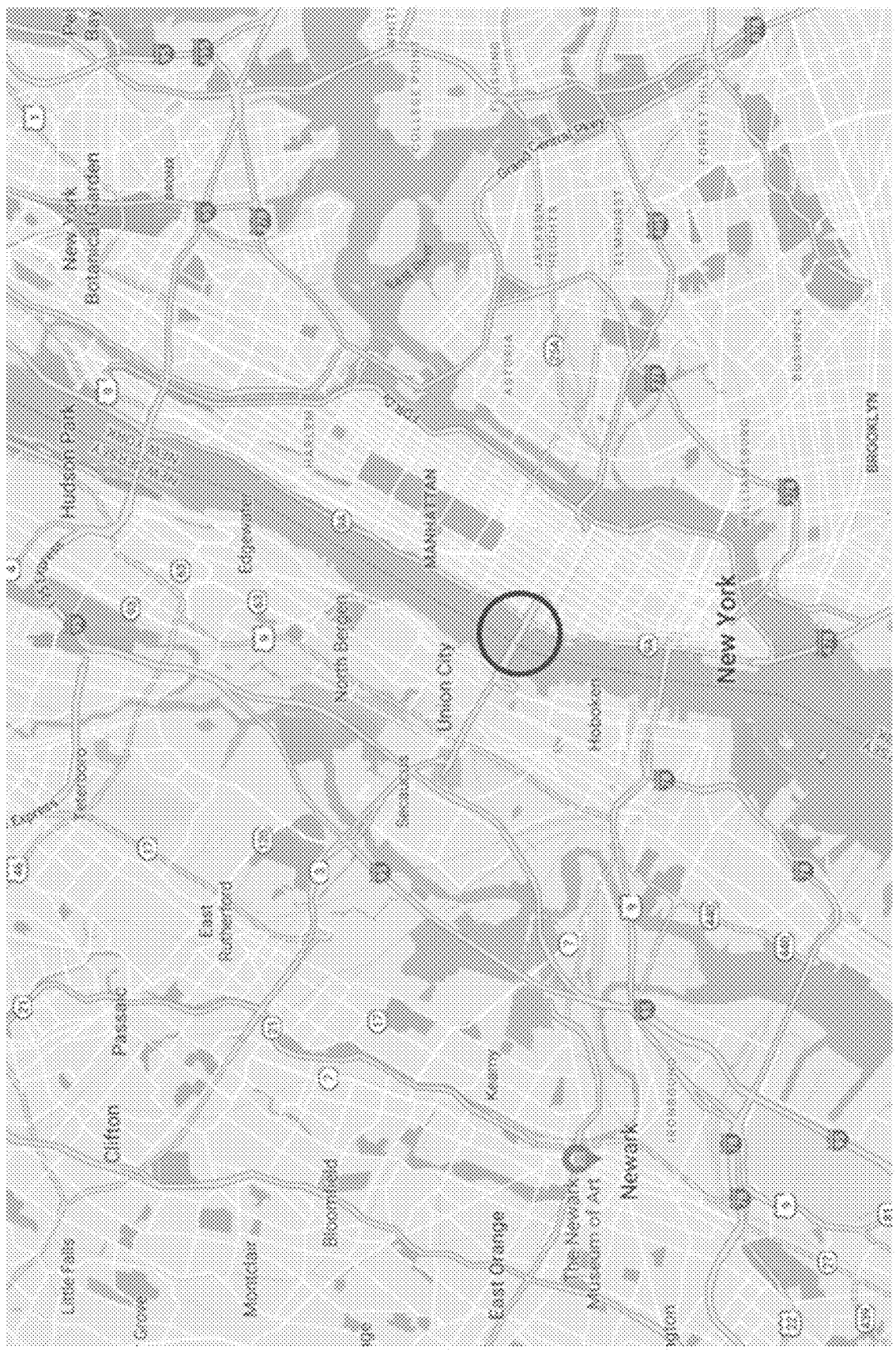
FIG. 3 is a map of Manhattan highlighting the Lincoln Tunnel.

FIG. 2 highlights the Brooklyn Bridge which is one of the routes into Manhattan. The Brooklyn Bridge connects the Island of Manhattan with Long Island and there are many people that live in Long Island so that the Brooklyn Bridge may be a choke point. However, FIG. 3 highlights the Lincoln Tunnel that connects 99% of the country to the Island of Manhattan. Therefore, the Lincoln Tunnel route can be identified as the best choke point for Manhattan to secure it against attacks and one could shut down that route first to remove the greatest amount of risk of any attack.

Similarly, for Directory Services, it would be desirable to identify the "choke points" attack paths for Directory Services in the computer network. For Directory Services, attack path choke points are the coalescing of specific privileges, permissions, relationships and user behaviors which represent a critical specific configuration that combine multiple attack paths and, if severed or remediated, could eliminate the risk of these multiple attack paths immediately. The below disclosed system and method can identify these choke points attack paths for Directory Services and thus reduce the greatest amount of risk of a Directory Services attack with the resources that are available to an administrator of the computer network. Furthermore, the system described below allows the administrator to focus security efforts or remediation efforts on those choke points and thus increases the ability of the computer network to resist the Directory Services attacks. The below disclosed system and method achieve the above benefits using technical improvements to existing computer network security systems that provides a technical solution to the technical problem of Directory Services attack path access permission security.

An embodiment of the system and method for continuously collecting, analyzing and reporting attack paths and choke points present in Directory Services may be known as BloodHound Enterprise. The system and method are different than other known systems due to its comprehensive dataset, continuous analysis, and structural presentation in a logical tiered isolation view. Unlike other technologies, the system and method analyzes the nested object relationships within Directory Services alongside objects at risk for Credential Theft to calculate all possible attack paths within the environment and then identify the attack path choke points. This analysis may be done in a continuous manner beginning with the centralized collection of relevant data sources through a mix of active device interrogation and streaming event collection. These data sources represent the necessary pre-requisite elements which the system ingests into a graph database which is then run through an analytics engine to identify all possible Attack Paths and the choke points. As Attack Paths are discovered, they can either be served in real-time as a bespoke alert for security personnel or can be grouped by commonality to identify chokepoints within Directory Services tiers that an actor can use to elevate privilege and complete their objective.

These tier privilege chokepoints represent flaws according to security best practices in Privileged Account Management (PAM) models for Directory Services. The most well-known PAM model for Directory Services is Microsoft's "Active Directory Administrative Tier Model" (disclosed and accessible at the following publicly accessible website: docs.microsoft.com/en-us/windows-server/identity/securing-privileged-access/securing-privileged-access-reference-material.) In this model, assets are grouped into three tiers:

Tier 0—the most critical assets and users with power over the entire enterprise

Tier 1—assets and users with control over enterprise servers and applications with significant business value such as a database server containing social security numbers for a health care provider Tier 2—assets and users with control over user workstation and devices such as Help Desk and computer support administrators In this tier structure, it is understood that users and assets within a specific tier should only conduct administrative actions within that specific tier. This is done to protect systems "using a set of buffer zones between full control of the Environment (Tier 0) and the high-risk workstation assets that attackers frequently compromise". However, no system currently exists which allows administrators to understand the Attack Paths that may cross these boundaries either through their faulty implementation of Directory Services permissions or through the login activity of their users. The disclosed system provides Directory Services Administrators with this comprehensive, real-time tiered isolation view of their environment and aggregates the Attack Paths connecting these tiers that violate this PAM model and allow malicious actors to complete their target objective as discussed in more detail below.

Unlike the open source Bloodhound FOSS program that collects data from a single source, perform manual, point in time data collection and presents Attack Paths for users to use in pursuit of a target objective as described above, the disclosed system and method, such as that implemented in the Bloodhound Enterprise embodiment, is different for a number of reasons. First, the disclosed system and method aggregates data from multiple collection points across multiple networks and performs continuous data collection which are not possible using the Bloodhound FOSS program. Furthermore, the disclosed system and method identifies all Attack Paths for the purpose of defensive mitigation and elimination, presents Tiering Isolation Structure for isolating privilege in accordance with security and administrative best practice. groups Attack Paths by common elements, prioritizes Attack Path remediations by impact and severity and provide proactive alerting to highlight newly observed Attack Paths that are also not possible using the Bloodhound FOSS program.

Figure 4:
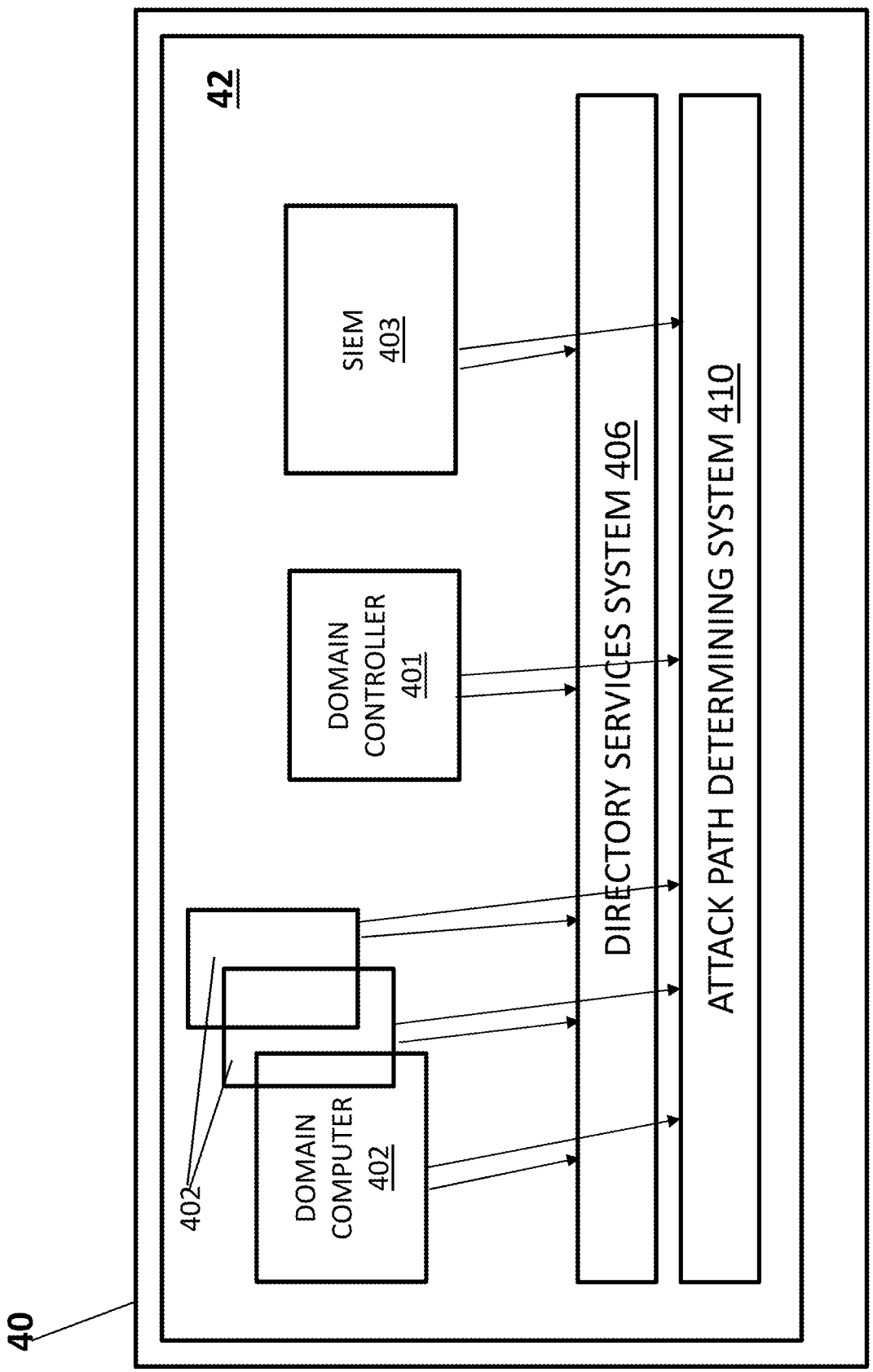
FIG. 4 illustrates an enterprise infrastructure that may be protected by an attack path determining system.

FIG. 4 illustrates an enterprise IT infrastructure 40 that is being protected by an attack path determining system 411 in which the enterprise IT infrastructure 40 may have one or more data centers 42 that house various components of the enterprise IT infrastructure 40 including the attack path determining system 411. For example, the data center 42 may further include one or more directory services system(s) 406 that manage the access permissions of the assets in the system. As shown in FIG. 4, each of the components of the enterprise IT infrastructure 40 may be coupled to each of the directory service system(s) 406 and the attack path determining system 411. In one example shown in FIG. 4, the enterprise IT infrastructure 40 may be managed primarily by Microsoft®'s Directory Service "Active Directory" (an example of the directory services system 406) and the infrastructure 40 may include one or more domain computers 402 and one or more domain controllers 401. The domain controller 401 may provide the reference information to delegate rights to the objects within the enterprise IT infrastructure. Each domain computer 402 may hold a record of the applicable delegations for itself as well as any explicit rights. It is also possible that an organization may store similar records from Active Directory within a centralized Security Information and Event Management (SIEM) system 403, such as each record that is written each time a user is added to a group.

One component of the enterprise IT infrastructure, whether on-premise, cloud-hosted, or hybrid environment, is the one or more Directory Services system(s) 406. These are a shared information infrastructure for locating, managing, administering and organizing everyday items and network resources, which can include volumes, folders, files, printers, users, groups, devices of any operating system, telephone numbers and other objects. A directory service (implement by the one or more directory service system(s)) is a critical component of a network operating system and each resource on the network is considered an object by the directory service server that is part of the directory service system 406. Information about a particular resource is stored as a collection of attributes, including which resource has permissions to perform particular actions, such as accessing, deleting or modifying the resource amongst others, or are associated with that resource or object. This information can be stored centrally by the Directory Services system 406 itself or within the Directory Services resources or objects directly.

One of the duties performed by Directory Services 406 is to dictate which resources have access to other resources. For example, Directory services 406 may specify that the "HelpDesk" user group has the ability to modify the passwords of users within the environment in order to facilitate regular operations within the organization. Similarly, the "Finance" group may be granted the right to access a certain group of files "Taxes" within a "Finance Servers" enclave to both support the access requirements to complete a task but also to block other, non-Finance users from accessing sensitive information. Thus, Directory Services grants or denies access rights to a resource for various actions.

Directory Services rights may be explicitly granted or delegated. For example, an administrator may define, within the Directory Services Server or instance, the user group for "Finance". This group may include all the relevant employees within the Finance organization. Next, the Administrator may define the group of machines "Finance Servers" which the organization utilizes. The Administrator may define a right for the "Finance" group to have access to the "Finance Servers". Therefore, any new user added to "Finance" would be automatically granted the rights to the resources he or she may need to complete their regular duties. This is an example of a delegated right that is inherited due to the other rights in the Directory Services system.

Similarly, the Directory Services rights can be explicitly granted through individual systems. For example, "Jim", a member of the "Legal" group, may temporarily or permanently require the need to access information hosted within a system which is grouped under "Finance Servers". This individual does not belong to the user group for "Finance" and would not automatically be granted the inherited rights to complete their task. In this instance, the administrator may choose to modify the local access rights within the server named "FINSERV0001" located within "Finance Servers" and grant "Jim" access rights. This is an example of an explicitly granted right.

It is important to note that rights that were granted explicitly may or may not be represented by the Directory Services server but rather within the individual systems or objects under which this right was granted. In other words, the Directory Services server may not be aware that "Jim" has rights to "FINSERV0001" when, in fact, he does have access rights to that system.

Figure 8:
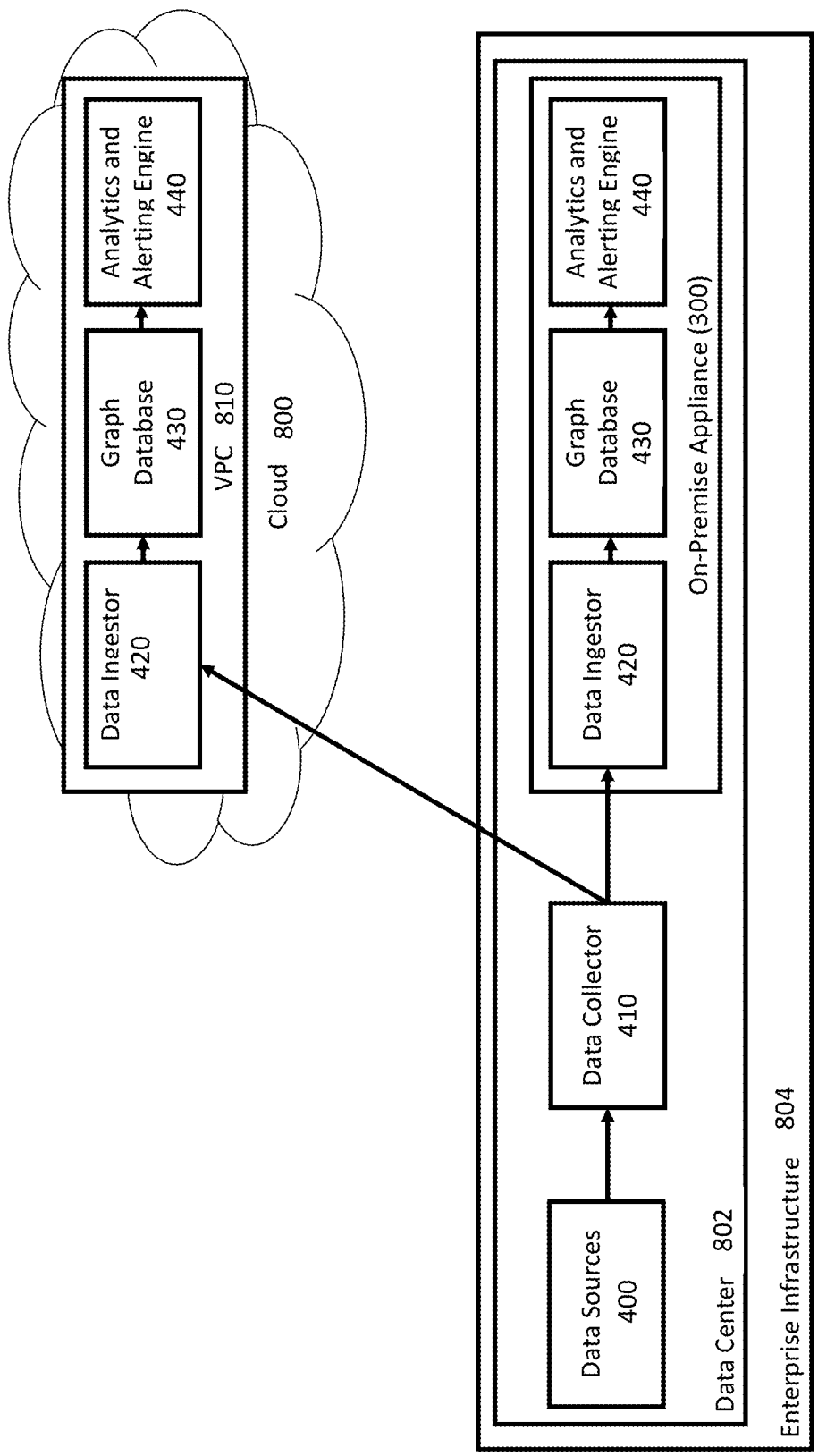
FIG. 8 illustrates the embodiment of the BloodHound Enterprise systems conducted as an on-premise physical/virtual appliance or systems running within a cloud.

The attack path determining system 411 shown in FIG. 4 gathers information continuously from the elements 402-403 and the Directory Services system 406 and determines attack paths that may exist due to the various access rights granted explicitly or delegated and generates alerts, etc. to notify an administrator of the attack paths. For example, a new access grant may be made in the network that, due to delegated rights, opens up an attack path that can determined by the attack path determining system 410. The one or more Directory Services system(s) 406 may be implemented as one or more server computers that have a processor and memory and instructions stored in the memory that may be executed by the processor to perform the Directory Services operations, including the grant or withdrawal of access rights for a resource. The attack path determining system 411 may be implemented in software (instructions being executed by a processor that is part of a computer system of the network or its own computer system as shown in FIG. 4, or a cloud computer resource as shown in FIG. 8 that performs the operations/processes of the attack path determining system as described below. Alternatively, the attack path determining system 10 may be implemented in hardware, such as the appliance shown in FIG. 5 or any other piece of hardware that can implement the various operations/processes of the attack path determining system as described below.

Figure 5:
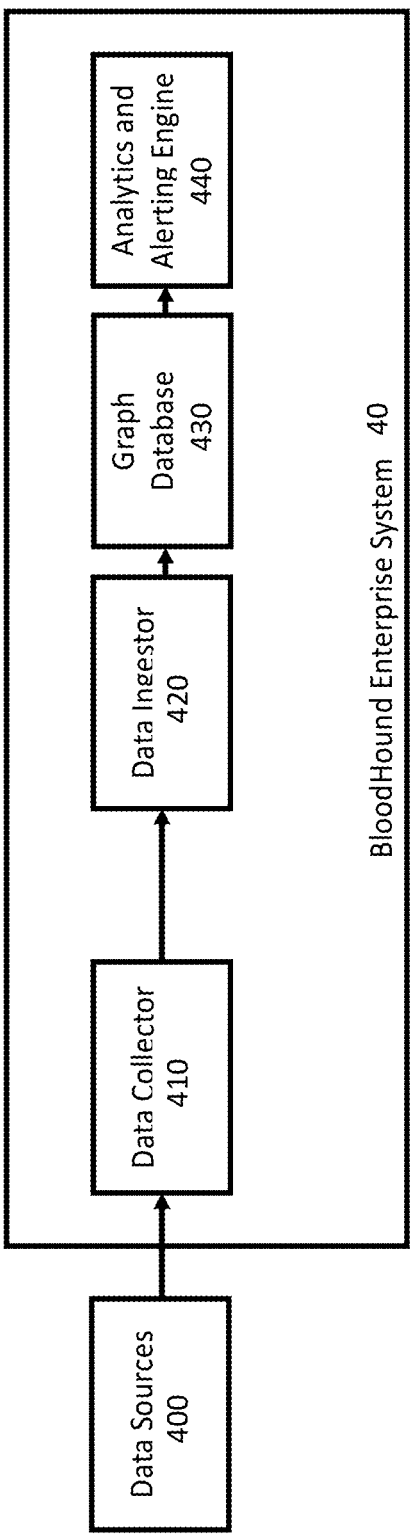
FIG. 5 illustrates an embodiment of the attack path determining system, implemented as a BloodHound Enterprise system and its major components.

FIG. 5 illustrates an embodiment of the continuous attack path determining system 411, with the embodiment being an implementation of a BloodHound Enterprise system, and major components. Each element of the system 411 shown in FIG. 5 may be implemented as a plurality of lines of instructions/computer code that are executed by a processor of the system 411 to implement the functions of each element in FIG. 5. Alternatively, each element may be implemented as a hardware device (integrated circuit, ASIC, state machine, appliance shown in FIG. 8, etc.). In some embodiments, one or more of the elements may be integrated into a computer system with a processor.

Figure 6A:
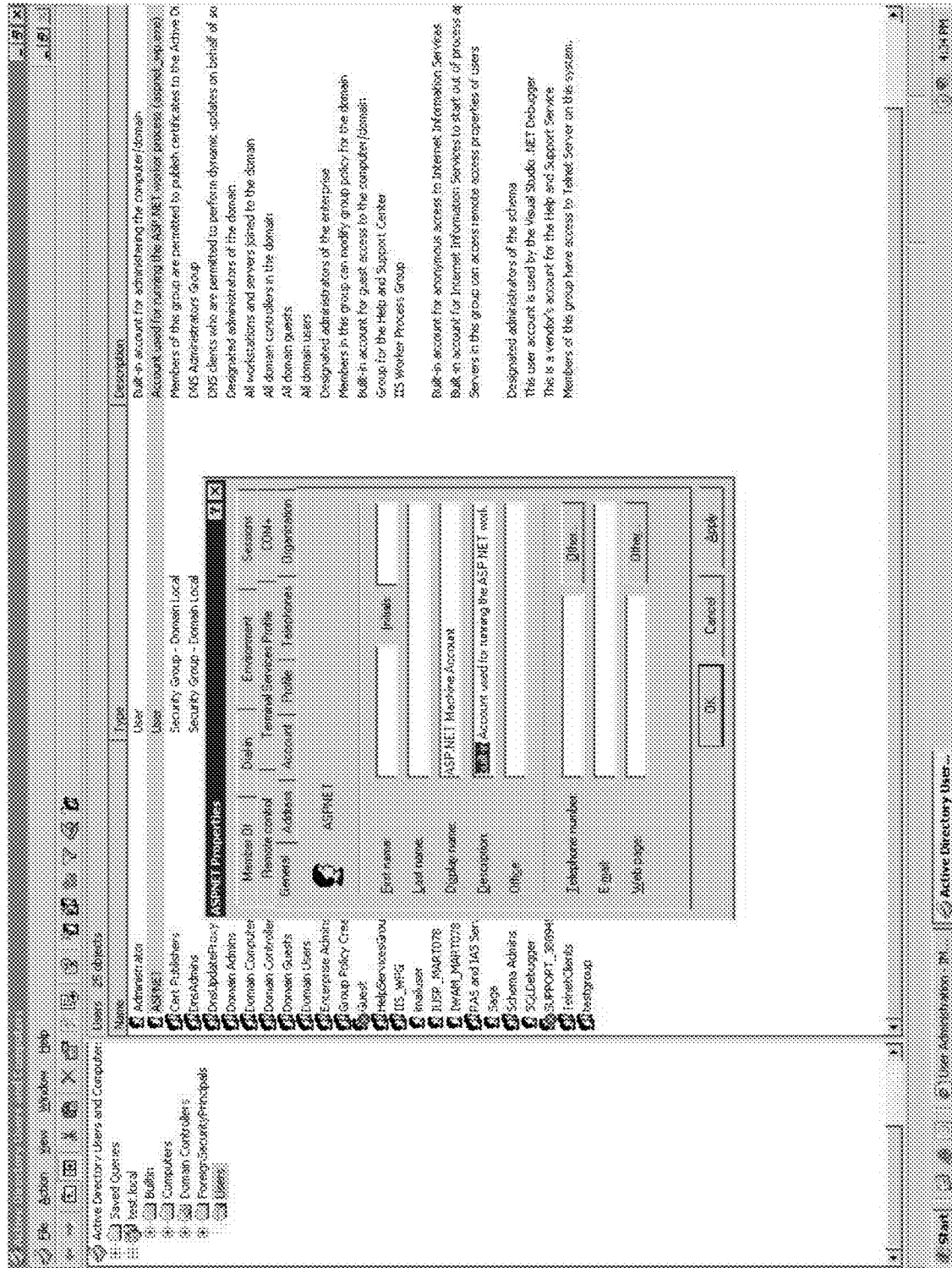
FIGS. 6A and 6B illustrate examples of the active directory data and local group data that may be part of the data continuously gathered from the data sources.
Figure 6B:
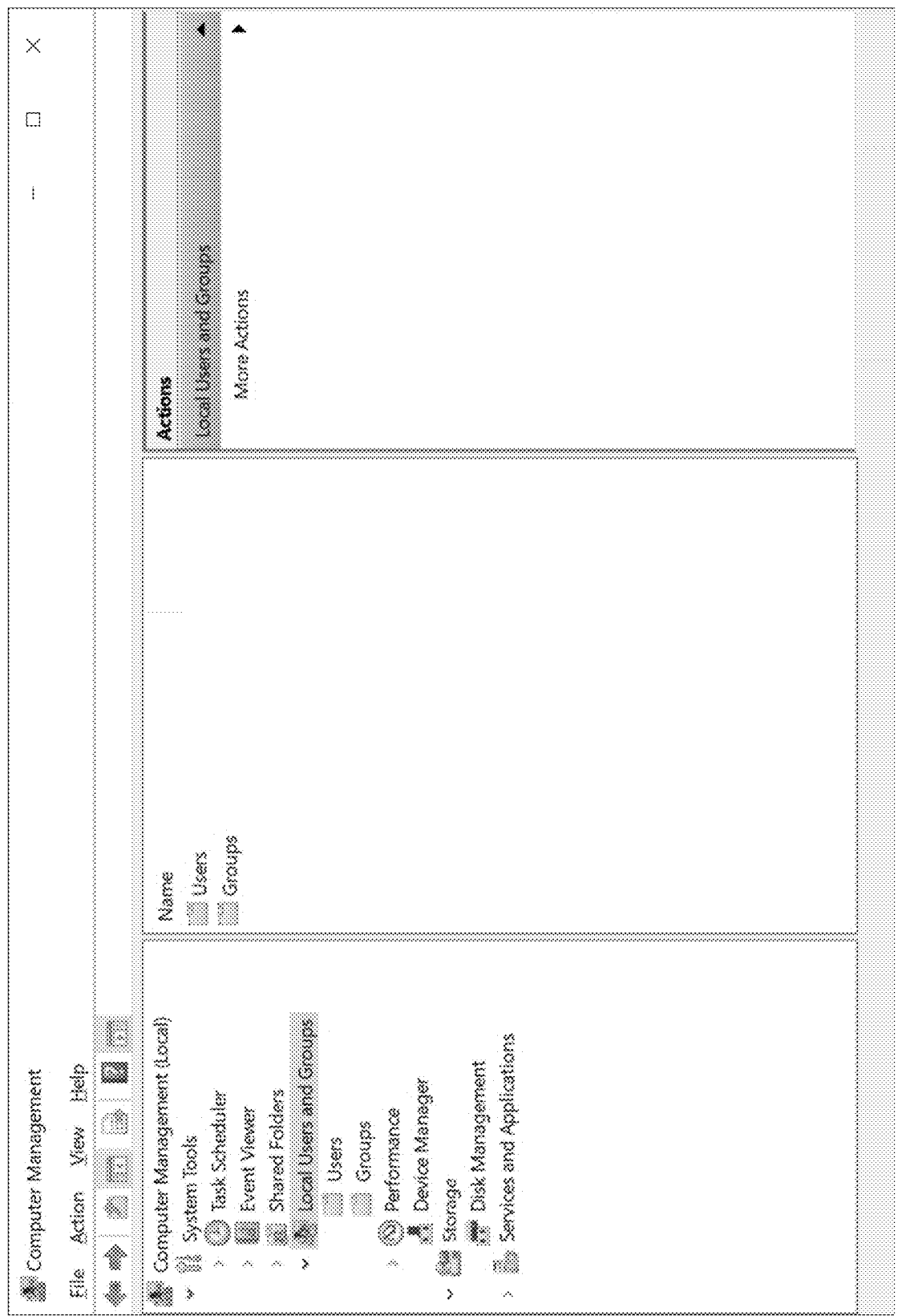
Figure 20:
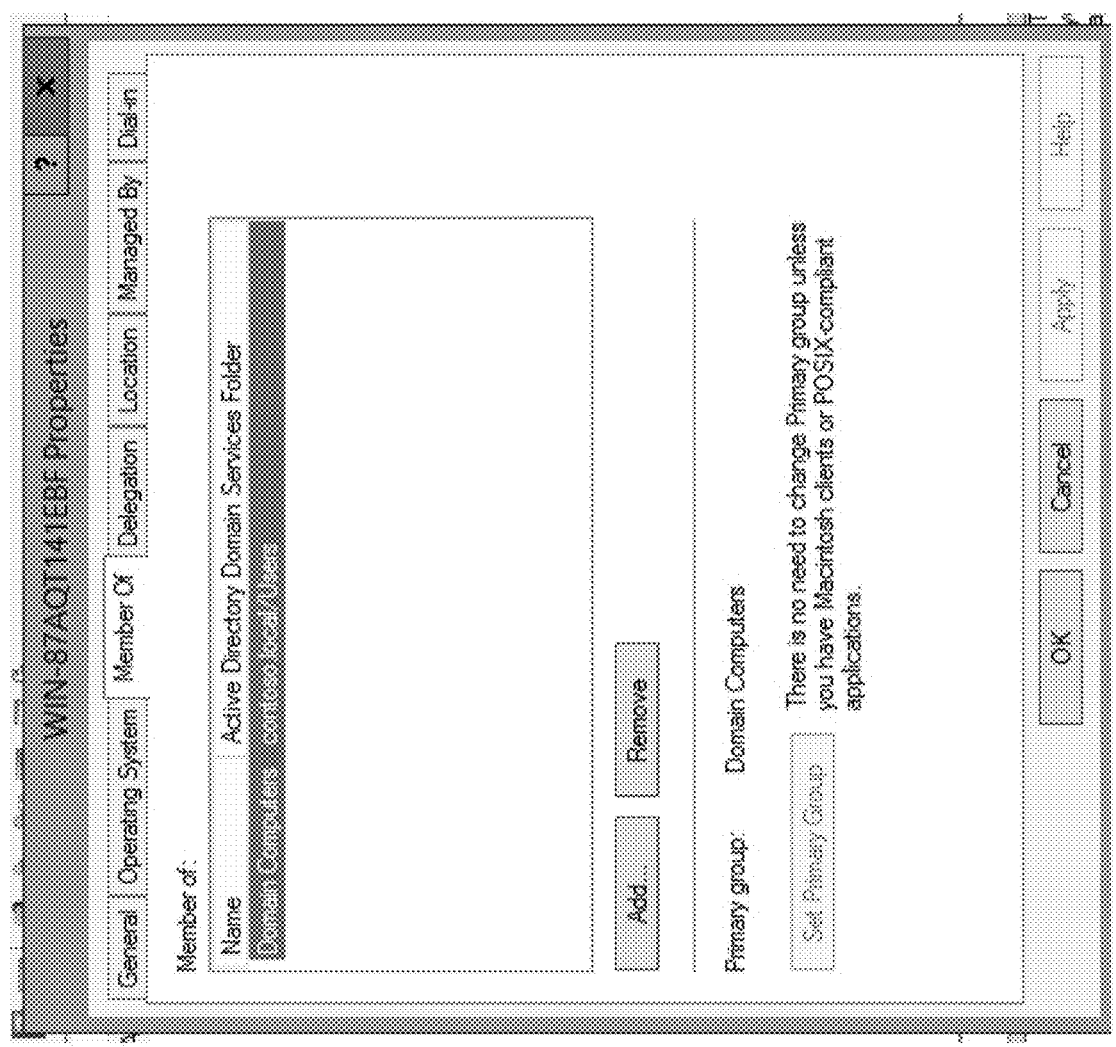
FIG. 20 illustrates an example of a computer "Member of" user interface showing the data.
Figure 21:
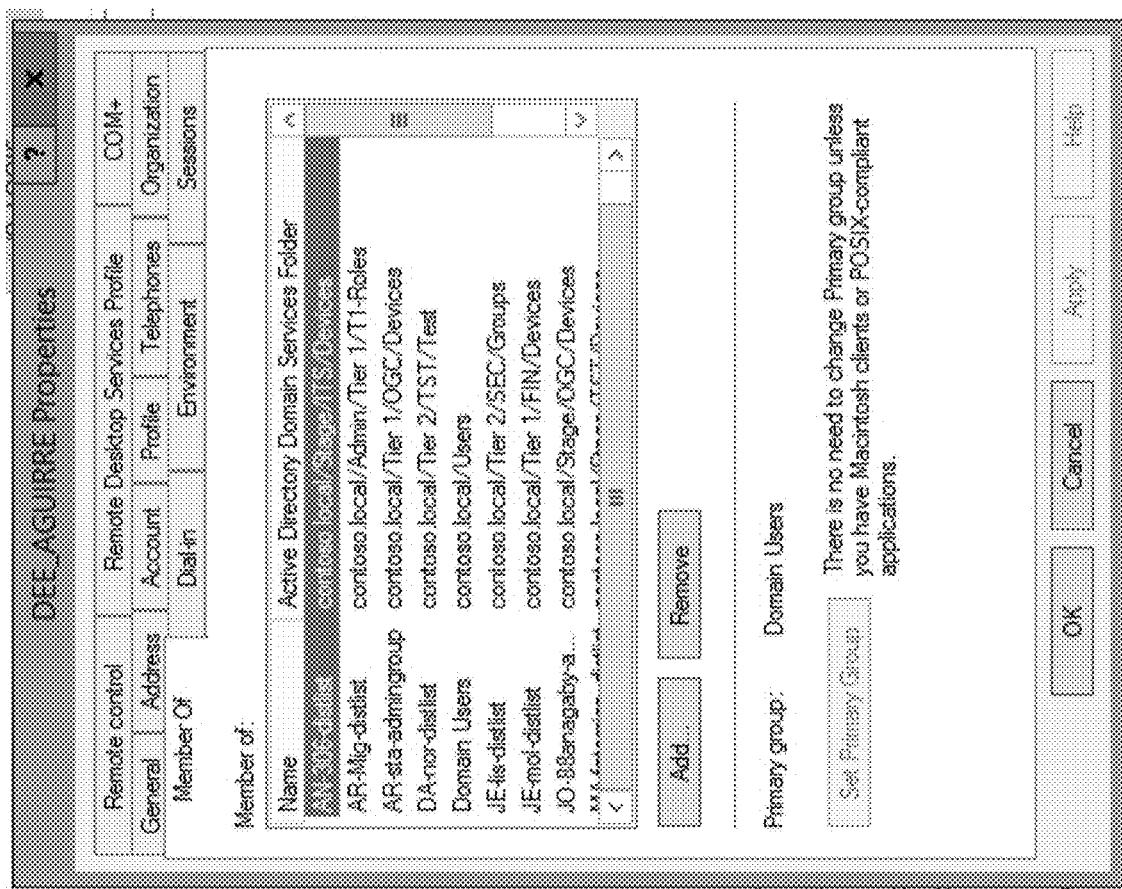
FIG. 21 illustrates an example of a user "Member of" user interface showing the data.

The attack path determining system 411 may include a Data Collector 410, which may be run as a Virtual Machine (VM), Container, or as services on top of any base Operating systems (OS) and collects relevant data from one or more data sources 400 which reside within an environment that includes the system 411. For example, each of the one or more domain computers 402, the domain controller 401 and the centralized Security Information and Event Management (SIEM) system 403 shown in FIG. 4 may be a data source 400 that provides data to the data collector 410. FIGS. 6A and 6B illustrate examples of the active directory data and local group data that may be part of the data continuously gathered from the data sources. FIG. 6A shows the data fields and data that are contained in directory services data, the active directory system in this example, for each component of the network, such as the permissions for actions and the MEMBER OF data that may indicate the delegated rights for that component of the network. FIG. 20 shows an example of a computer "Member of" user interface and the data while FIG. 21 shows an example of a user "Member of" user interface and its data.

FIG. 6B illustrates an example of the fact that the directory services data that is continuously collected may include local user and groups data about the permissions, both explicit and delegated. These Data Sources 400 may have their data continuously collected by the Data Collector 410 through active interrogation of other systems within the environment, through passive collection of streaming data sent by another system, or a hybrid of the two before standardizing the output format, such as into a JSON format, and shipping to a Data Ingestor 420. The Data Ingestor 420 then receives standardized data before loading this data within a Graph Database 430. In one embodiment, the data ingestor 420 may be/include an application programming interface (API) that takes the data and loads it into the database.

The graph database 430 is a known type of database that has nodes and edges that are used to store data and the relationships between the data. In the system 411 in FIGS. 4-5, the graph database 430 may be used to store the Directory Services objects (nodes) and their connecting relationships (edges). For example, this database may identify and store the user "Jane" (object) who is a member of (edge) the "Finance" group (object). Another record lists that the "Finance" group (node) can access (edge) the computers within the "Finance Servers" machine group. This is similar to the method popular mapping software, such as Google Maps, that stores destinations (nodes) and roads (edges) in order to serve directions between two locations.

Returning to FIG. 5, an Analytics and Alerting Engine 440 extracts data/queries data/requests data from the graph database 430. The Analytics and Alerting Engine 440 may then run a set of analysis across the Graph Database 430 either in continuous or batch processes which can generate alerts and intelligence that may be surfaced to a Directory Services Administrator, Information Security Representative, or others. The system 411 may also have a choke point determining system (discussed below in more detail) that retrieves data from the graph database 430 to determine choke points for the computer network as discussed below with reference to FIGS. 22-27.

FIG. 7A illustrates an example a rule 700 in pseudocode that the Analytics and Alerting Engine 440 uses to generate an alert. Note that the FIG. 7A is only one example of the pseudocode that implements a rule to generate the alert. The Analytics and Alerting Engine 440 may have a set of a plurality of rules, each with different triggers and data inputs that generate the alert, wherein each of the set of rules is continuously executed to determine if a directory services attack path is identified.

An example of the set of rules are now described. The set of rules may be categorized such that each rule identifies a particular attack path and has a recommended solution to the identified particular attack path. For example, the set of rules may have a plurality of rules that identify: 1) attack path to Tier 0 assets in a network; 2) abusable Kerberos configurations; 3) Least Privilege Enforcement and Privileged Account Management, etc. The plurality of rules for identifying attack path to Tier 0 assets each seek to remove those attack paths to Tier 0 assets in the enterprise network. Each rule for attack path to Tier 0 assets may have a different remediation of the problem. For example, one rule may restrict Tier 0 User Account Logons, another rule may remove Users and Groups from Local Groups on Tier 0 Computers, another rule may restrict Control of Group Policy Objects (GPOs) that Apply to Tier 0 Assets and another rule may restrict Control of Tier 0 Objects.

The plurality of rules for identifying abusable Kerberos configurations each seek to resolve these configuration problems so that an attacker cannot use those configurations maliciously and gain improper access to assets of the network. Each rule for abusable Kerberos configurations may have a different remediation of the problem. For example, one rule may harden or remediate Kerberoastable User Accounts, another rule may address Computers Trusted for Unconstrained Delegation and another rule may restrict Control of Computers Trusted for Unconstrained Delegation. A computer trusted for unconstrained delegation means that the asset has trust to delegate access to any service.

The plurality of rules for identifying least privilege enforcement and privileged account management seek to resolve these issues by limiting the access rights for each asset to a minimum required access privilege. Each rule for least privilege enforcement may have a different solution. For example, one rule may trim Execution Rights Held by Large Security Groups and another rule may audit Potential Vulnerable Account Passwords, such as password that do not have strong passwords.

As shown in FIG. 7A, each rule may be continuously evaluated based on a set of triggers based on the collected directory services data, such as "Attack Path Edge is discovered which connects Tier 0 Node to any non-Tier 0 Node". Note that each rule is written to take advantage of the way in which the continuous directory services data is stored in the graph database 430. The rule may then have alert process, such as "Post to Alert API and send alert, include: Description, Impacted Objects and Recommended Remediation" as shown in FIG. 4A that is executed when the particular rule is satisfied.

Figure 7B:
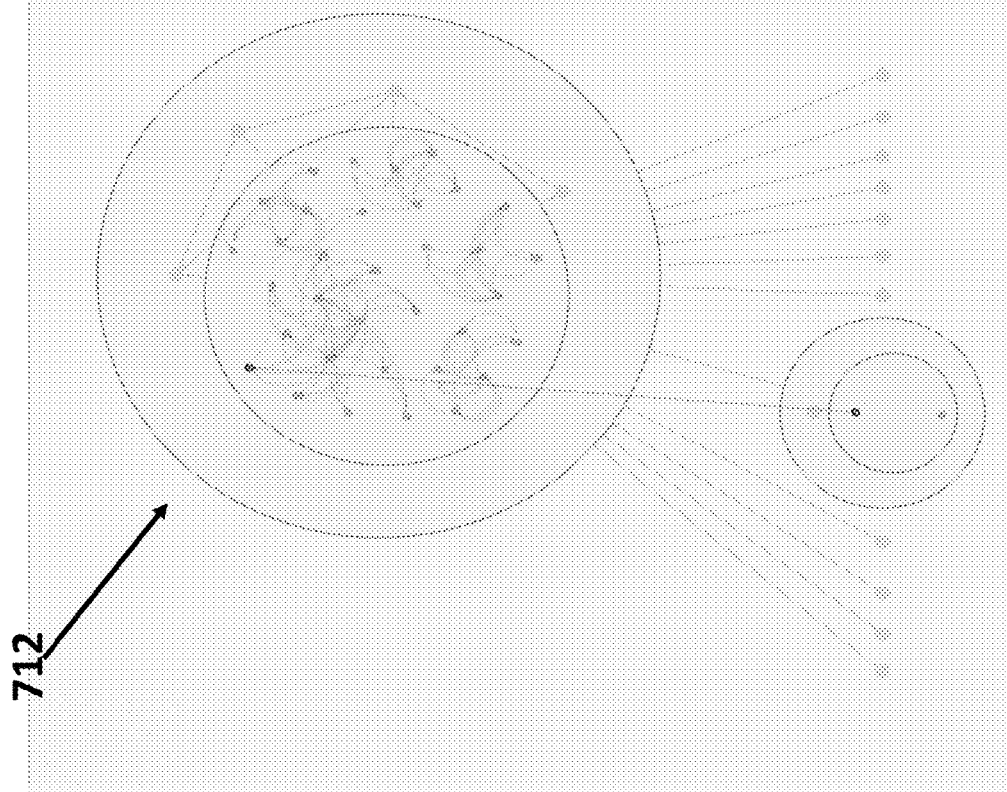

FIG. 7B illustrate an example of the alert 710 that is generated based on a triggered rule, such as rule 700 shown in FIG. 7A based on the exemplary directory services data shown in FIGS. 12-15 and described below. As shown in FIG. 7B, the alert 710 may include a graphical representation 712 of the problem that in this example may be "Attack Path Edge is discovered which connects Tier 0 Node to any non-Tier 0 Node" and a narrative 714 that contains a recommended solution ("remove Tier 1 assets from the Local Administrator Groups on Tier 0 assets" in this example), a description of the problem, some further recommendations about the problem and supporting data in the form of graphs, charts, or other visual aides to facilitate prioritization and impact analysis for the user. As shown in FIGS. 8-12, this alert may present detailed findings specific to the single Attack Path Edge 640 which is connecting one Attack Path Element 620 to another in a higher or lower tier. The alerts may also summarize and group findings by Attack Path Aggregated Edge 611 and present supporting data in the form of graphs, charts, or other visual aides to facilitate prioritization and impact analysis for the user.

FIG. 8 illustrates the embodiment of the BloodHound Enterprise systems 411 executed as an on-premise physical/virtual Appliance 300 or systems executed within a Cloud (800) environment. In this example, the On-Premise Appliance 300 is running within a Data Center 802 which is part of an Enterprise Infrastructure 804. The Data Sources 400 in the enterprise infrastructure 804 are collected by the Data Collector 410 before transmission to the On-Premise Appliance 300 for the remainder of the BloodHound Enterprise System 411 to consume and execute. Alternatively, the Data Collector 410 may upload data via a Transport Layer Security (TLS) tunnel to a BloodHound Enterprise System 411 within a Cloud 800 environment. Here, standardized data from that specific Enterprise Infrastructure 804 is analyzed by this BloodHound System 411 which may house the Data Ingestor 420, Graph Database 430, and Analytics and Alerting Engine 440 under a full enclosed Virtual Private Cloud (VPC) 810. Thus, as shown in FIGS. 4 and 5, the system 411 for determining attack paths can be implemented in various different architectures all of which are within the scope of the disclosure.

Figure 9:
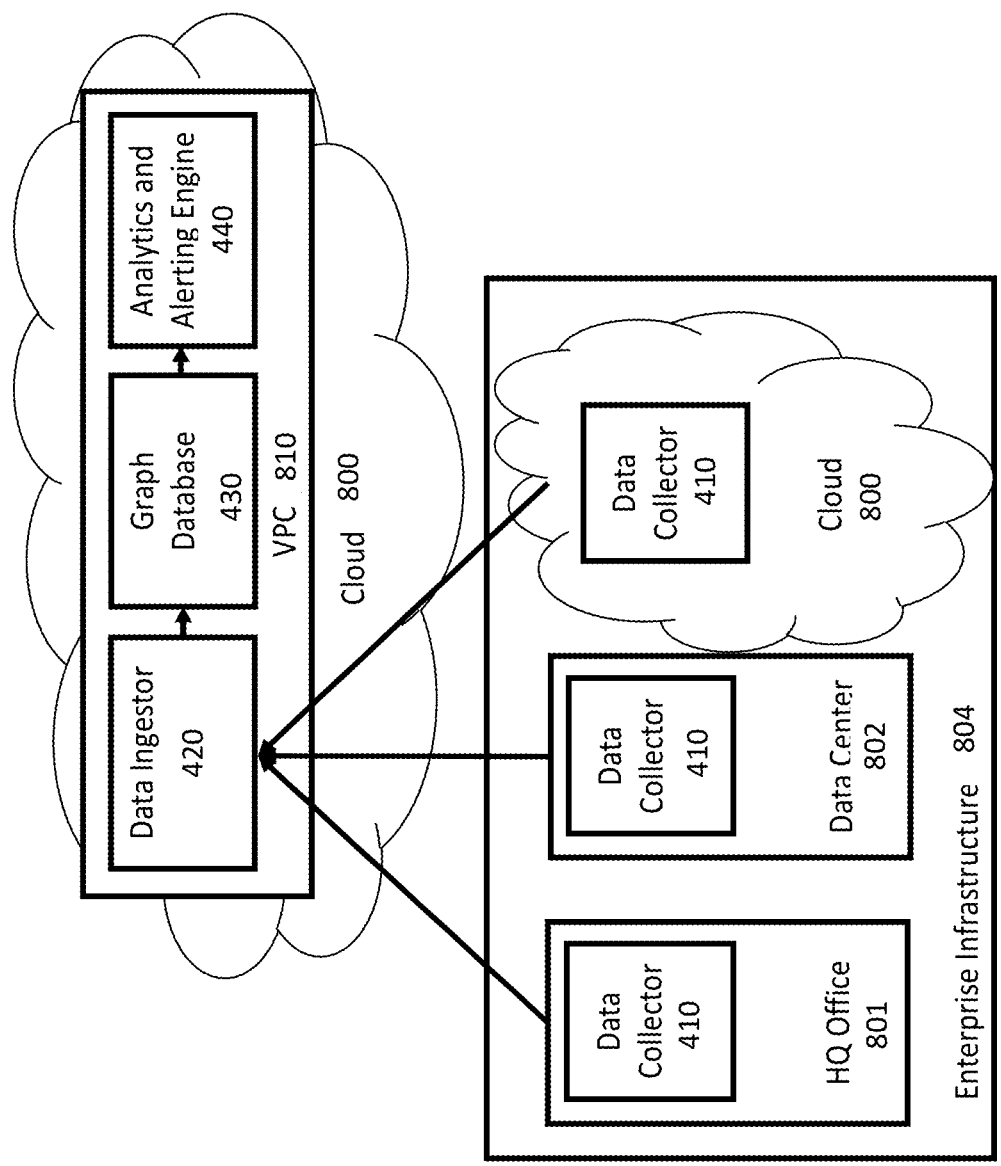
FIG. 9 illustrates the system collecting data from multiple enterprise sources with centralized ingestion.

FIG. 9 illustrates another embodiment of the system 411 in which system is collecting data from multiple enterprise sources with centralized ingestion, rule analysis and alerts. In this example, one or more Data Collector(s) 410 are located throughout the Enterprise Infrastructure 804. In the example in FIG. 9, these locations may include a HeadQuarters (HQ) Office 801, a datacenter 802, or within a public or private Cloud 800 each housing other enterprise systems. These Data Collector(s) 410 may use TLS tunnels to upload data to a centralized attack path determining sub-system that may be housed in a virtual private cloud 810 in the cloud 800 (that may be the same cloud 800 that houses a portion of the enterprise infrastructure 804 or a different cloud 800). The centralized attack path determining sub-system may include a centralized Data Ingestor 420 to allow for BloodHound Enterprise system 411 to conduct analysis across separated environments in aggregate. In this example, the other elements of the system 411 (the data ingestor 420, the graph database 430 and the analytics and alerting engine 440) may be remotely located from the one or more data collectors 410, but all operate in the same manner as already described above.

Figure 10:
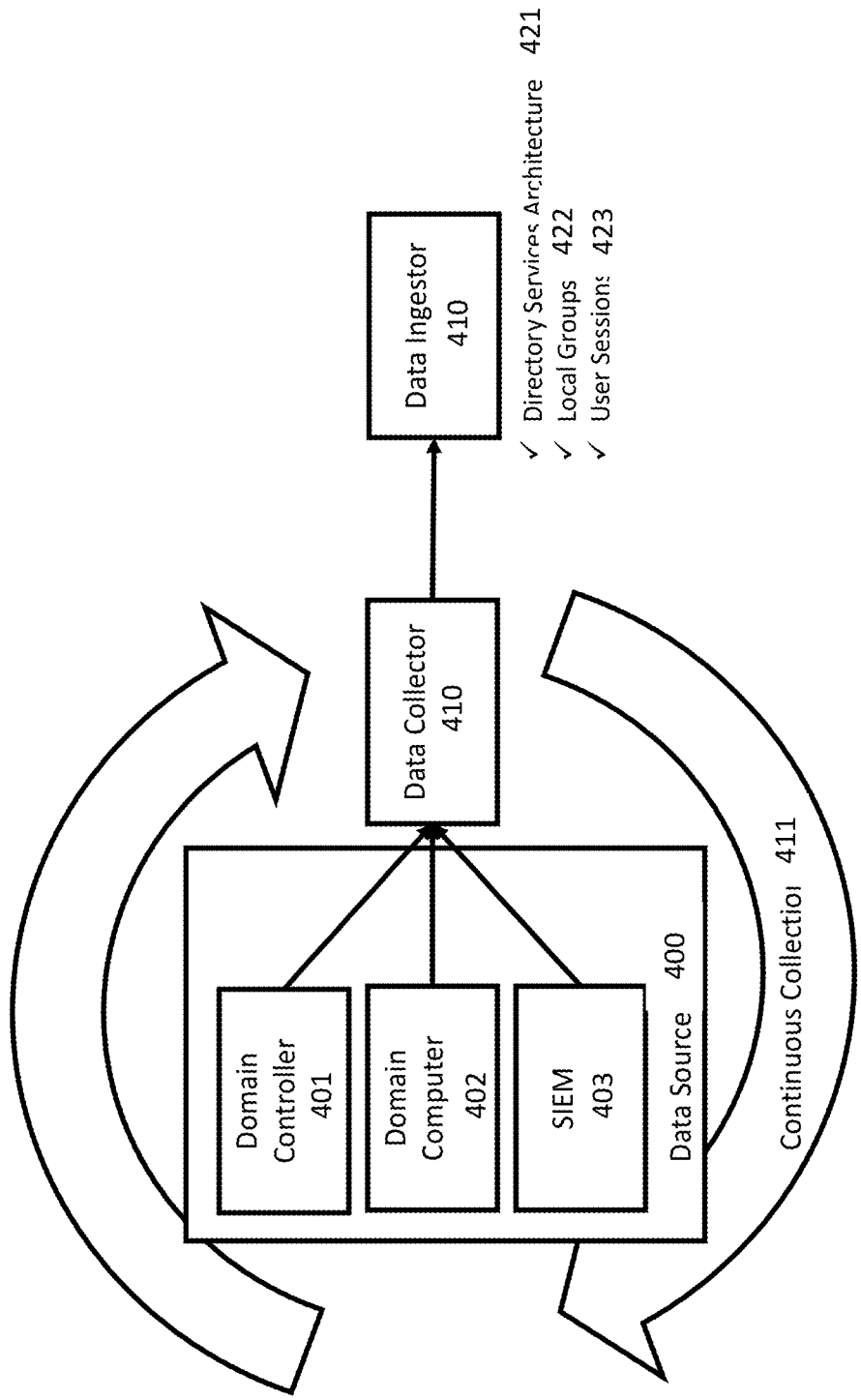
FIG. 10 illustrates the continuous collection of data sources for ingestion.

FIG. 10 illustrates the continuous collection of Data Sources 400 by the Data Collector 410 in any of the different embodiments of the system 411. Conventional systems and methods collect data snap shots whereas the disclosed system and method 411 may continuously collect (process 411) the data that is not done by conventional systems. The Data Sources 400 shown in FIG. 10 may include the active interrogation of one or more Domain Controller(s) 401, the active interrogation of Domain Computer(s) 402, or the passive collection of streaming log records which may be pushed by a centralized Security Information and Event Management (SIEM) system 403. This continuous collection may be executed in real-time, as part of a scheduled batch operation, or some combination of the two to gain a comprehensive dataset. These standardized records are then collected by the Data Ingestor 420 which may organize them into major categories such as the overall Structure of the Directory Services installation 421, details regarding the Local Group 422 permissions specific to each system, or recent and active individual User Sessions 423 specific to each system, amongst others as described above with reference to FIGS. 6A-6B.

Figure 11:
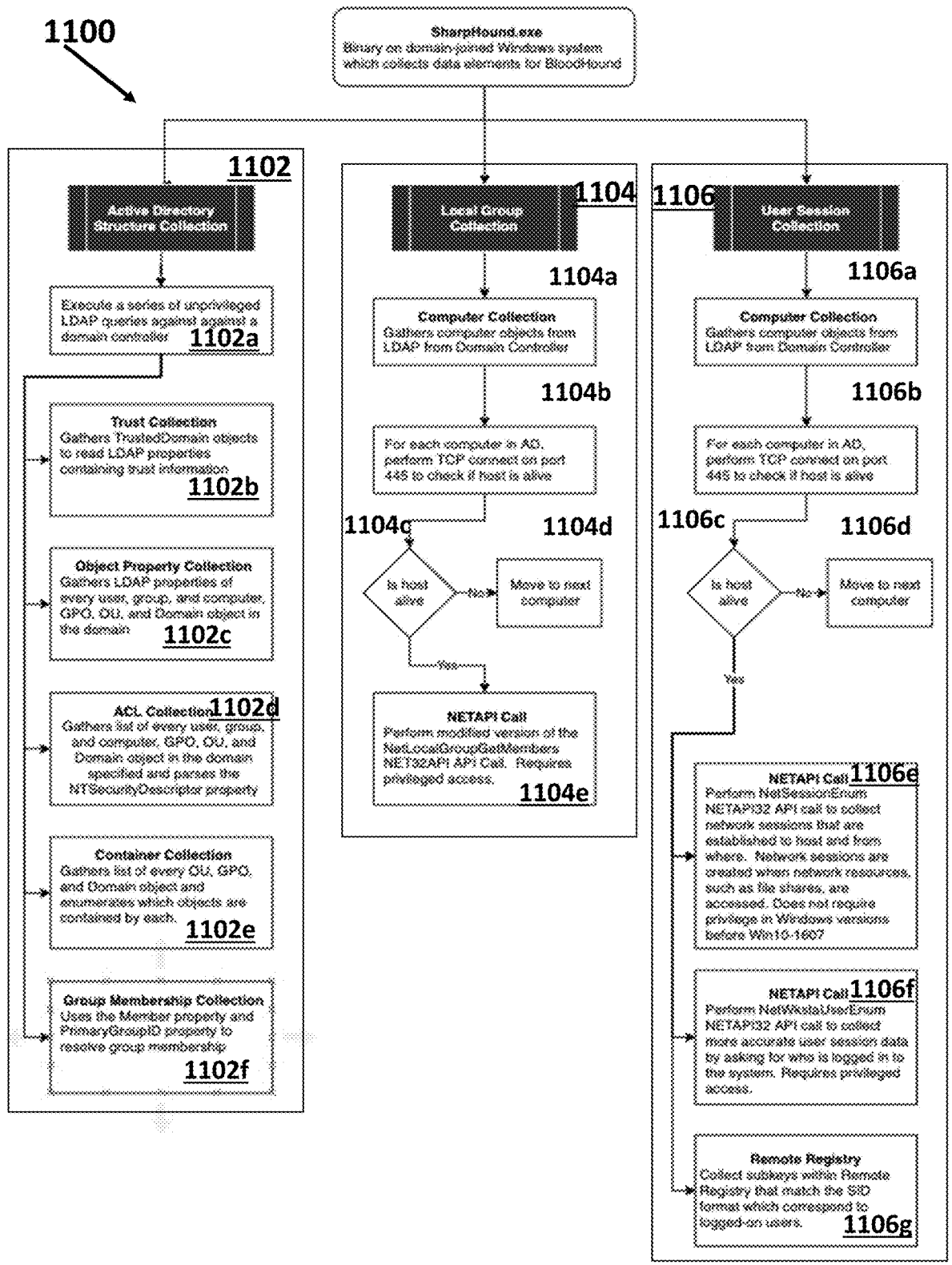
FIG. 11 is a flowchart showing more details of the continuous data collection process.

FIG. 11 is a flowchart showing more details of the continuous data collection process 1100 that may be performed by the data collectors 410 of the system 411. The method set forth in FIG. 11 may also be performed by other systems/computer systems, etc. The data collection process 1100 may include three processes being performed simultaneously including an active directory structure collection 1102, a local group collection 1104 and a user session collection 1106. The active directory structure collection 1102 may start by executing (1102a) a series of unprivileged LDAP queries against a domain controller. The process may also perform a trust collection (1102b) in which the process gathers TrustedDomain objects to read LDAP properties containing trust information and an object property collection (1102c) that gather LDAP properties of every group and user and computer, GPO, Organizational Units (OU) and domain objects in the domain. The process may also perform ACL collection (1102d) that gathers lists of every user, group and computer, GPO, OU and domain object in the particular domain and parses the NTSecurityDescriptor Property. The process 1102 may also collect containers (1102e) that gathers a list of every OU, GPO and domain object and enumerates which objects are contained by each. The process 1102 may also perform a group membership collection (1102f) that uses the Member property and PrimaryGroupID property to resolve group membership. For example, continuing the example above, this process may automatically determine the users/computer that are members of the Finance group.

The local group collection process 1104 may perform a computer collection (1104a) that gathers computer objects from LDAP from the domain controller. The process 1104 may, for each computer in the active directory gathered above, perform a TCP connect on port 445 to check if the host is alive (1104b, 1104c). If the host is not alive, the method moves to the next computer (1104d) and restarts this process 1104 at the top. If the host is alive, the method 804 may perform a NETAPI call (1104e) that is a modified version of the NetLocalGroupGetMembers NET32API call and requires privileged access. The method is completed when all of the computers are analyzed. Examples of the various types of data collected by the method 1100 shown in FIG. 11 are contained in Appendix A that incorporated herein.

The user session collection method 806 may perform a computer collection (1106a) that gathers computer objects from LDAP from the domain controller for each user. The process 1106 may, for each computer in the active directory gathered above, perform a TCP connect on port 445 to check if the host is alive (1106b, 1106c). If the host is not alive, the method moves to the next computer (1106d) and restarts this process 1106 at the top. If the host is alive, the method 1106 performs a NETAPI call that is a NetSessionEnum NET32 API call (1106e) to collect network sessions that are established to host and from where the network sessions are created when network resources, such as file shares, are accessed. The method 1106 may perform another NETAPI call (1106f) that is a NetWkstaUserEnum NET32 API call to collect more accurate user session data by asking for who is logged in to the system which requires privileged access. The method 1106 may then perform a remote registry process (1106g) that collects subkeys within a remote registry that match the SID format and corresponds to logged on user. The method is completed when all of the computers are analyzed.

Examples of Attack Path Determination and Alerting

To illustrate the operation of the attack path determining system and method is more detail, an example of the process using an example situation in the network will now be described.

Figure 12:
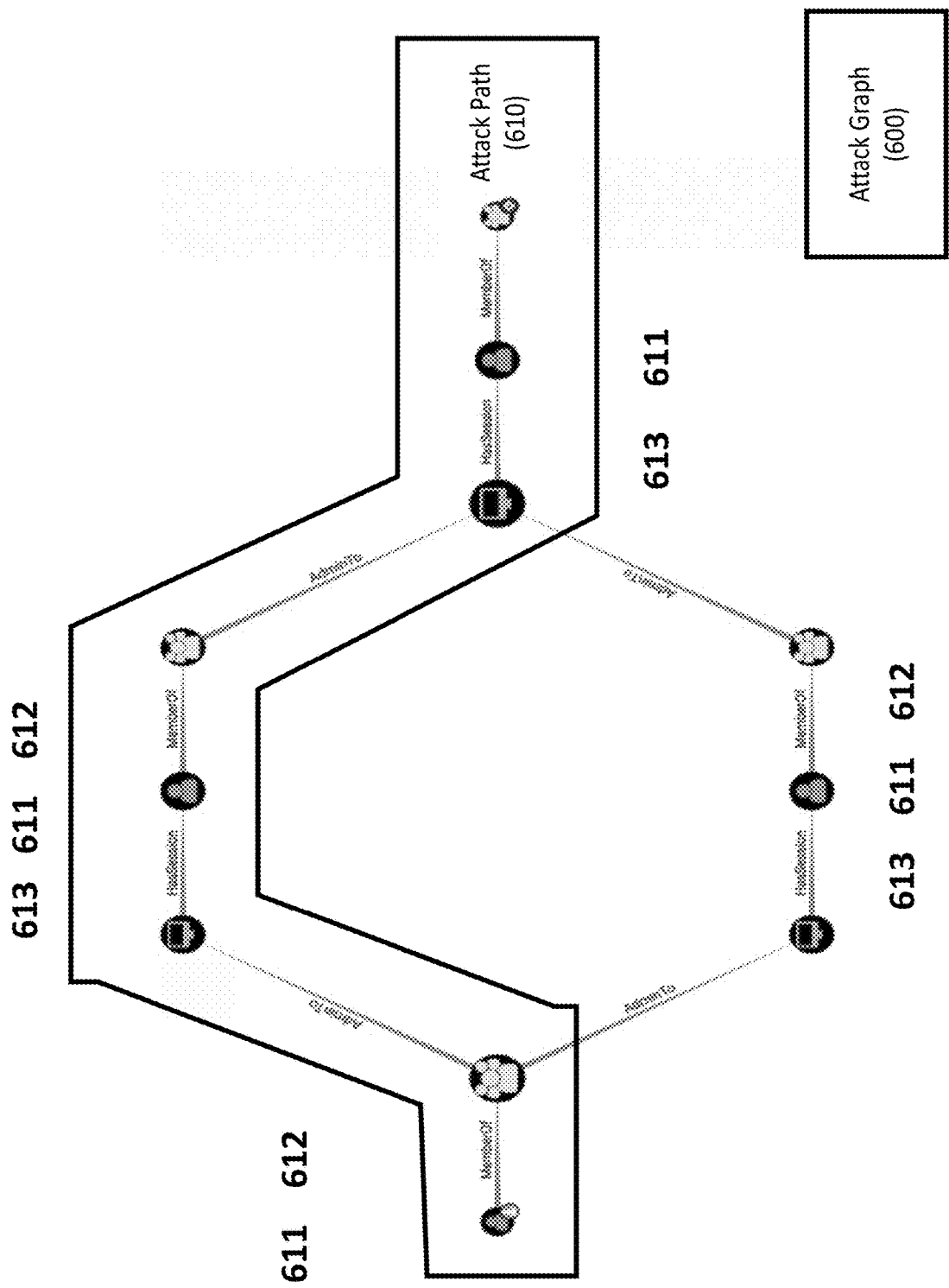
FIG. 12 illustrates the Attack Graph and identifies one Attack Path.
Figure 13:
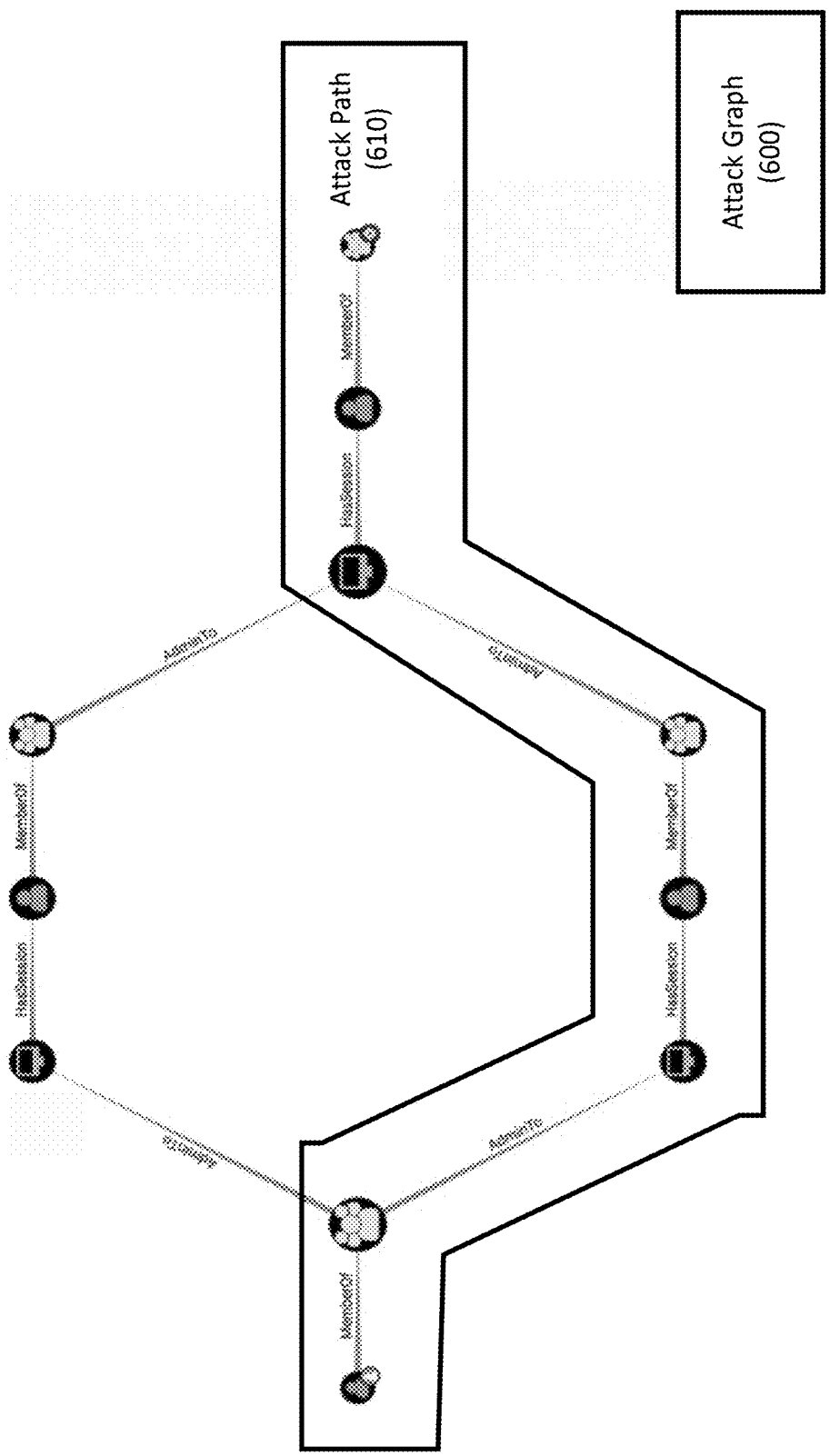
FIG. 13 illustrates the same Attack Graph and identifies an alternative Attack Path.

FIG. 12 illustrates an example of an Attack Graph 600 and highlights an available Attack Path 610. FIG. 13 Illustrates the same Attack Graph 600 but highlights a different Attack Path 610 because enterprise Infrastructures 200 contain any number of computers and users which may have access granted via Directory Services to perform any number of actions including accessing remote shares, making changes to underlying system configurations, or others. In the example in FIG. 12 or 13, the graph shows the permissions granted and then an unintended attack path 610 due to the permissions granted. These granted permissions and logins are represented by Attack Path Elements 620 and Attack Path Edges 640 which combine to create Attack Paths 610 which can be executed by a malicious actor.

Figure 14:
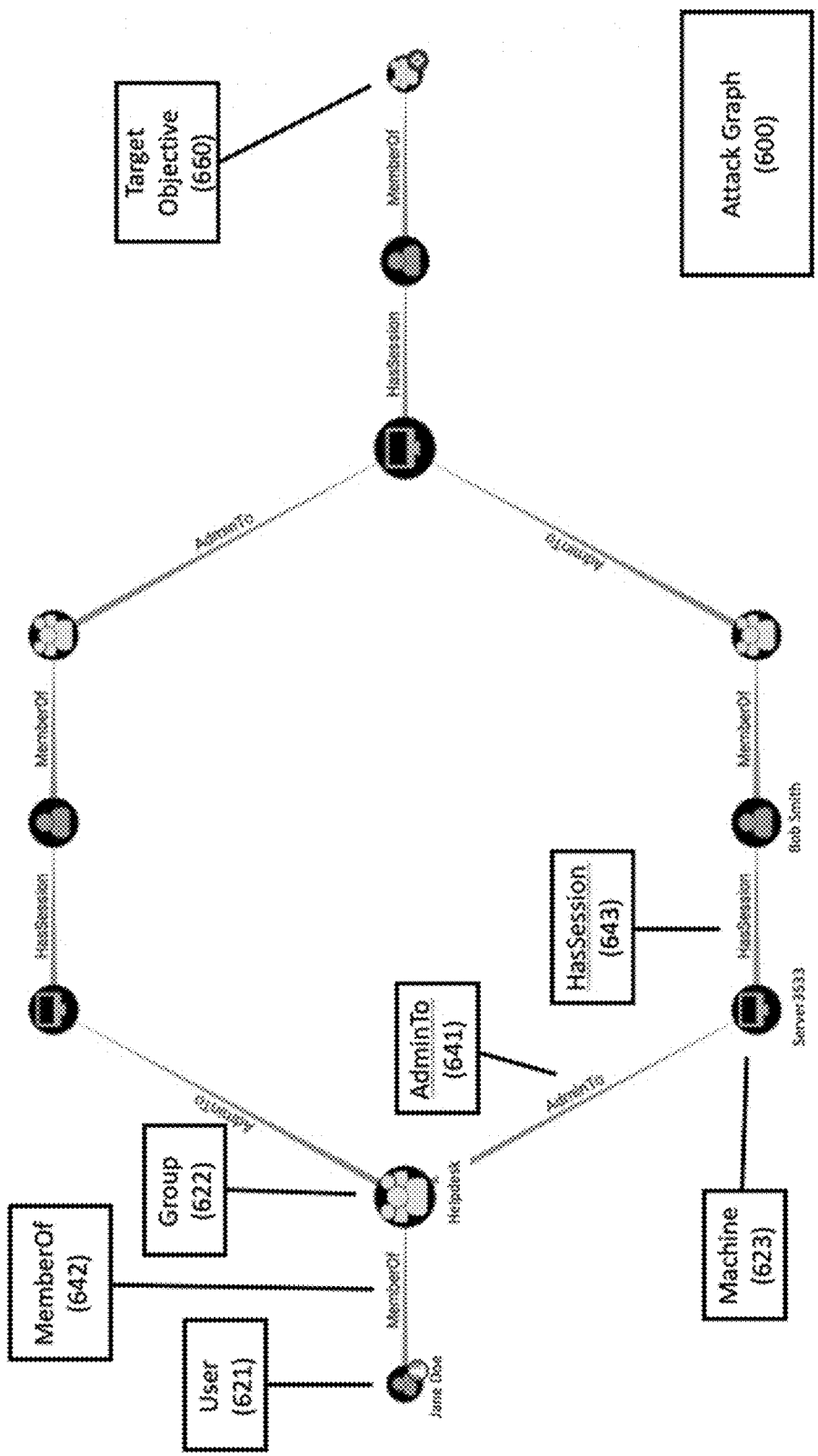
FIG. 14 illustrates a few elements that can create an Attack Path.

FIG. 14 illustrates the a few of the relationships that may introduce an Attack Path 610. In this illustration, the Attack Graph 600 contains two separate Attack Paths 610 which are comprised of Attack Path Elements 620, also known as nodes. These nodes can include, but are not limited to: Users 621, Groups 622 (groups of one or more users), Machines (computers, servers, etc.) 623, Group Policy Objects 624, Domains 625, and Organizational Units 626. These Attack Path Elements 620 are connected by Attack Path Edges 640 which can include but are not limited to: AdminTo 641, MemberOf 642, HasSession 643. In this example, the Target Objective 660 is a group of highly privileged users within the environment. The malicious actor can take two separate Attack Paths 610 to complete the Target Objective 660. This begins first with a User 621 "Jane Doe" who belongs to the "Helpdesk" Group 622 which is represented by the MemberOf 642 edge. The Helpdesk Group 622 has administrative control over the Server 623 labeled "Server 3533" which is represented by the AdminTo 641 edge. This Server 623 has a User Session 123 for another User 621 "Bob Smith" which is represented by the HasSession 643 edge.

In this example in FIG. 14, the malicious actor only needs to have access to the User 621 "Jane Doe" to begin executing his or her attack. As a member of the HelpDesk Group 622, the malicious actor can use the account for "Jane Doe" to access "Server 3533" and execute Credential Theft 700 operations to gain access for the account of "Bob Smith". The Attack Path 610 then continues as "Bob Smith" is part of another Group 622 which has administrative control over another Machine 623 which has another session for a User 621 which is grants access to the Target Objective 660.

Figure 15:
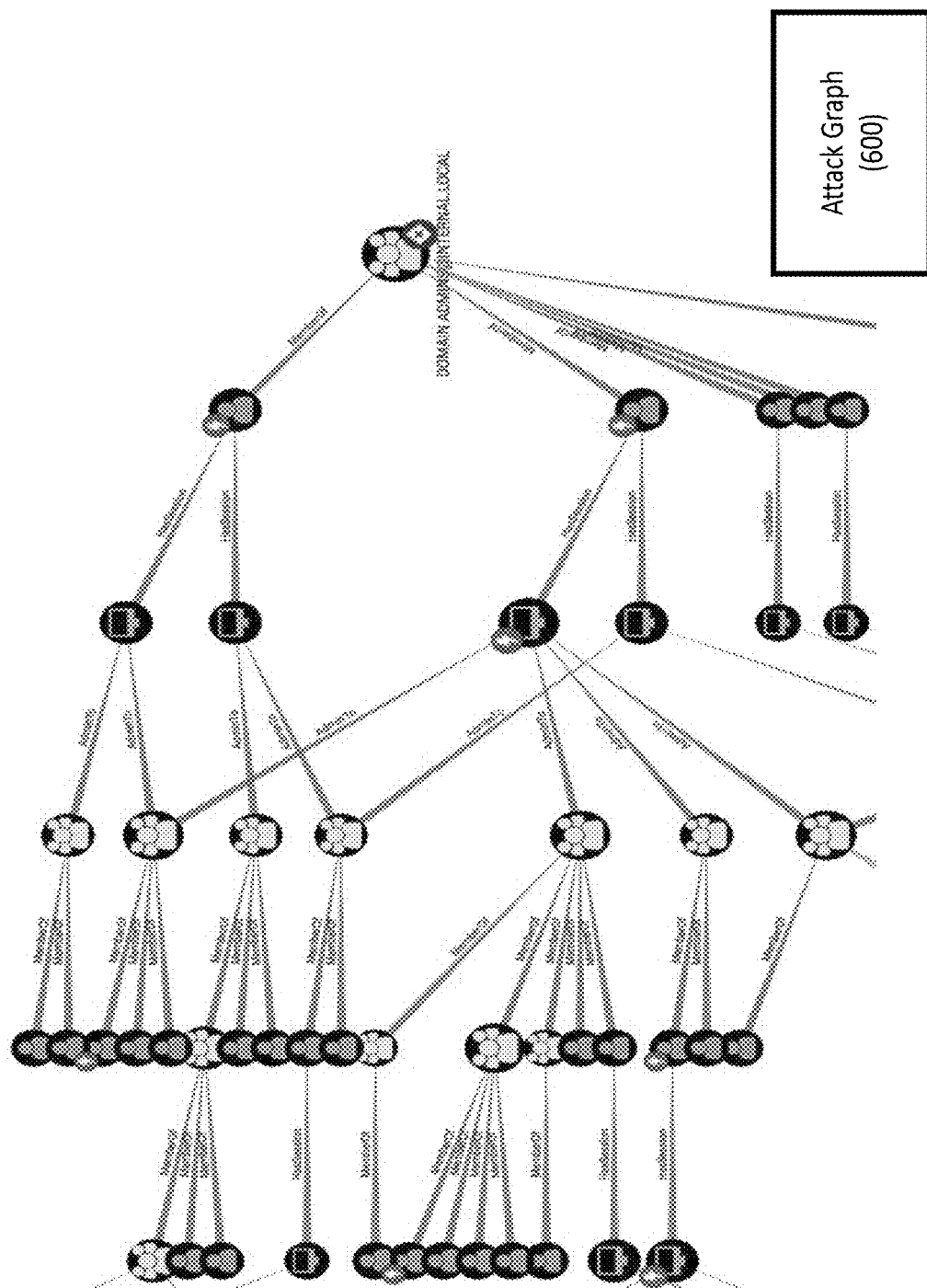
FIG. 15 illustrates an Attack Graph with greater complexity.

FIG. 15 illustrates an increasingly complex Attack Graph 600. The total number of nodes is still few compared to that of an Enterprise Infrastructure 200 and yet multiple Attack Paths 610 are present for exploitation by a malicious actor. Further complicating this for defensive security teams is the ever-changing Directory Services structure itself with new Users 621 added to new Groups 622, newly Group Policy Objects 624 created which grant new rights to other elements, or the constant access of network resources by Users 621 which creates new User Session 123 data to facilitate Credential Theft 700.

Figure 16:
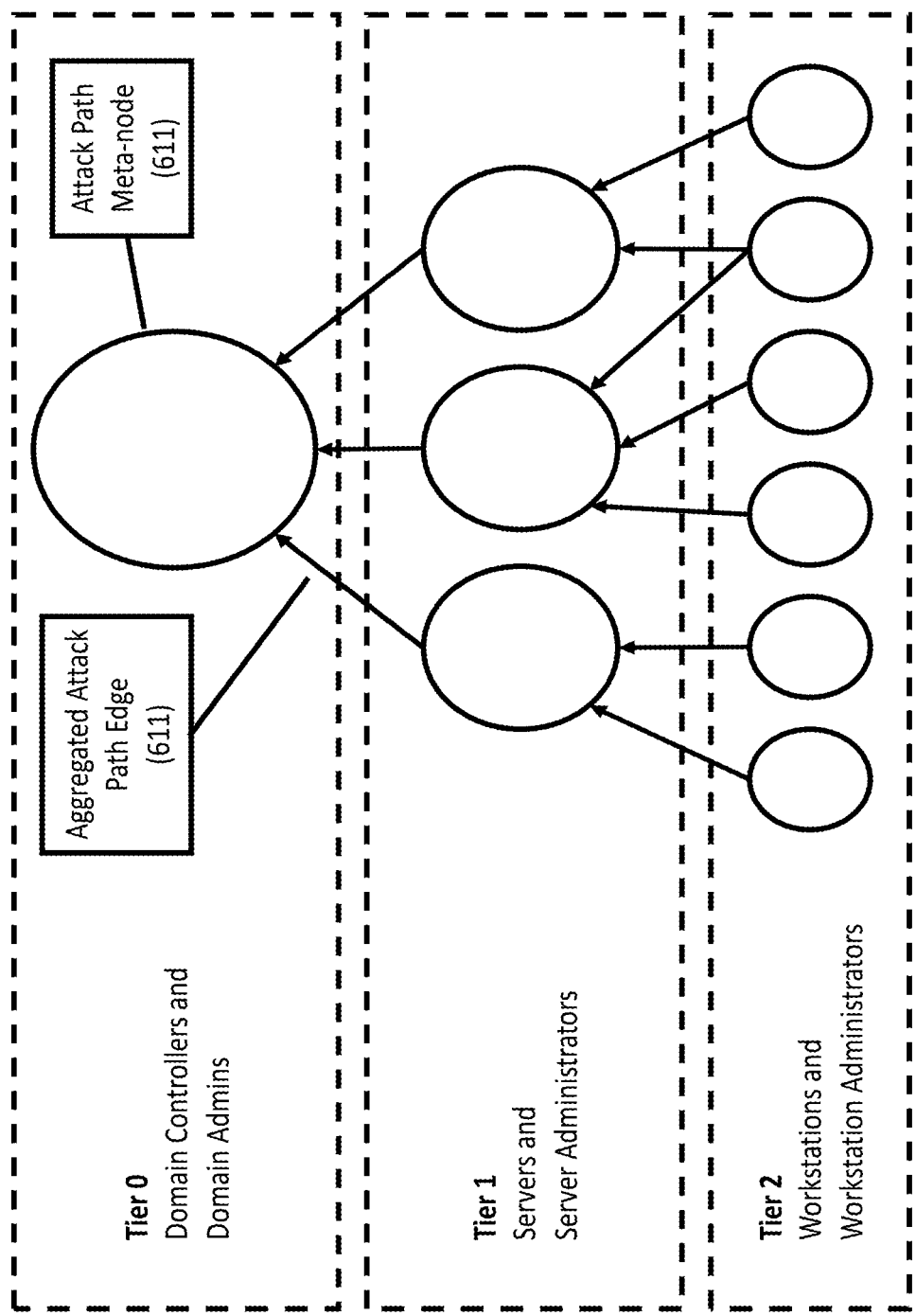
FIG. 16 illustrates the basic interface for understanding a tiered administration model for Directory Services within an environment.

FIG. 16 illustrates the basic interface for understanding a tiered administration model for Directory Services within an environment. This example has split the Directory Services elements into the logical Tiered Administration Model and presents the user with alerts by aggregating Directory Services Elements. Attack Path Elements are presented as Attack Path Meta-Nodes 612 which represent a grouping of machines, users, groups or others. These Attack Path Meta-Nodes are connected by shared Attack Path Edges 640 which are grouped alerts in the form of Attack Path Aggregated Edges 611. Each Attack Path Aggregated Edge 611 represents a common sense grouped flaw in the Directory Services architecture that allows malicious actors to move up in tier and access more sensitive information, take over the environment, or complete other Target Objectives 660.

Figure 17:
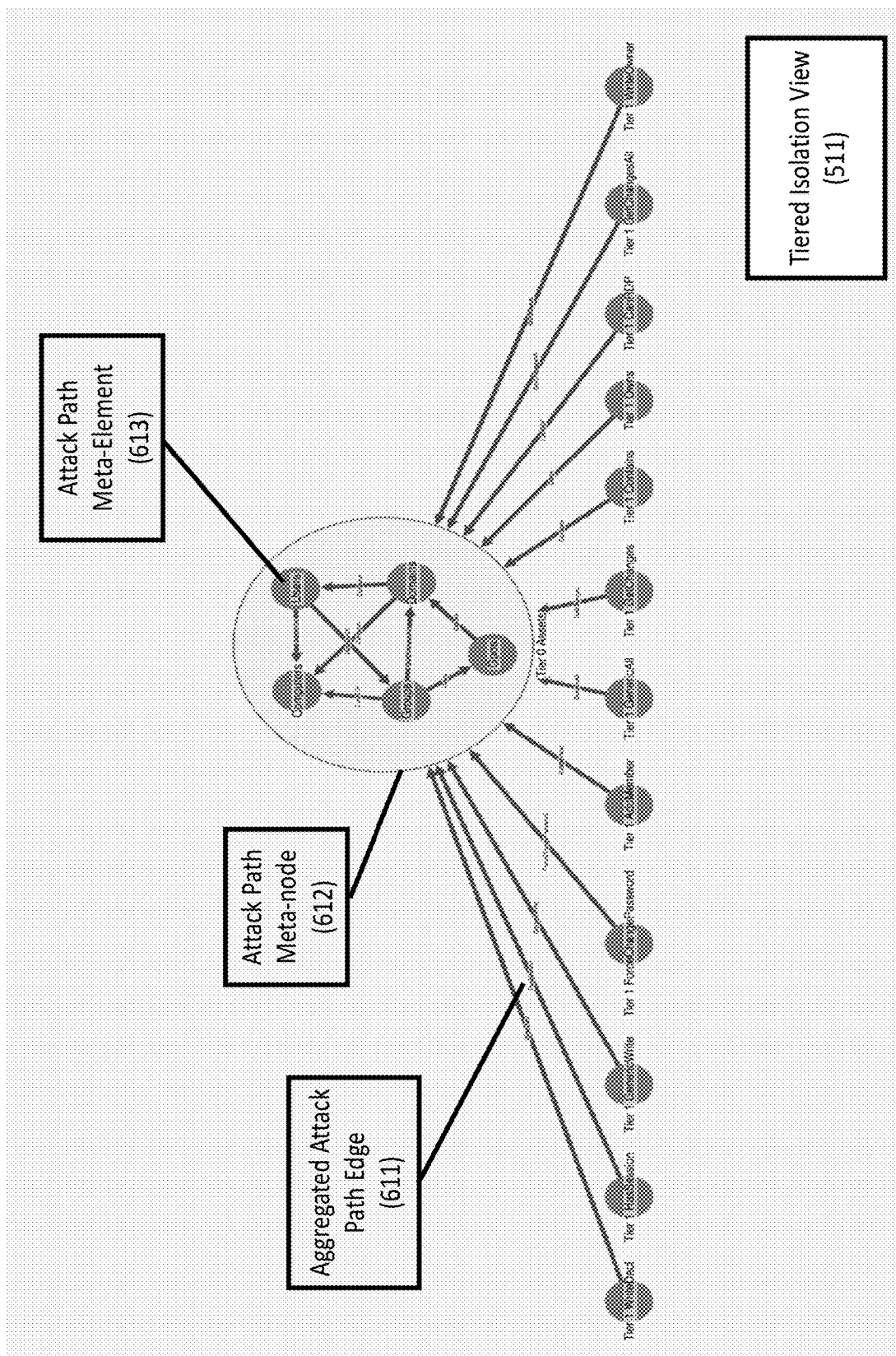
FIG. 17 illustrates an in-depth view of the Attack Path connections between two tiers of Directory Services assets.

FIG. 17 illustrates an in-depth view of the Attack Path connections between two tiers of Directory Services assets. Here, the Attack Path Meta-Node 611 for Tier 0 assets has connections from multiple Tier 1 assets, themselves grouped again as Attack Path Meta-Nodes. These connections represent assets with the same Attack Path Edges 640. For instance, any number of machines can make up the Attack Path Meta-Node which have a HasSession 643 edge that provide a connection point, or Attack Path Aggregated Edge 611, to the Attack Path Meta-Node 612 containing all Tier zero assets. This communicates to the user that any malicious actor that has access to any machine within this specific Attack Path Meta-Node has the ability to execute Credential Theft 700 and take over the enterprise. This graphic also introduces the Attack Path Meta-Element 613 which is a sub-group within an Attack Path Meta-Node. For example, all Users 621 that are part of Tier 0 are contained within the Attack Path Meta-Element 613 User object which is contained within the Attack Path Meta-Node 612 for Tier 0.

Figure 18:
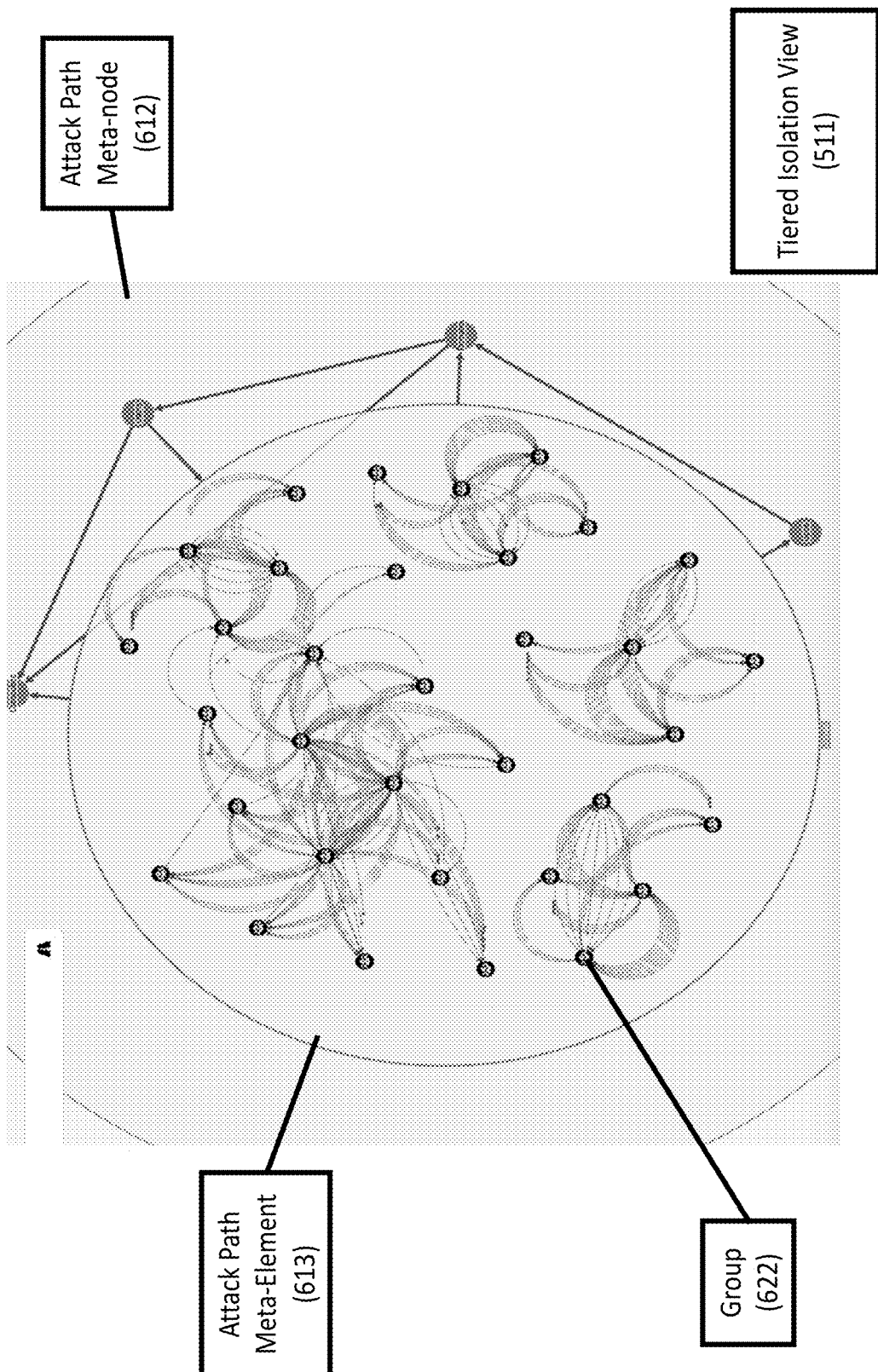
FIG. 18 expands on the Attack Path Meta-Node structure and provides a viewpoint to items contained within.

FIG. 18 expands on the Attack Path Meta-Node structure and provides a viewpoint to items contained within. Here, Attack Path Meta-Node 612 is expanded to reveal any number of Attack Path Meta-Elements 613 which themselves can contain any number of individual objects. In this specific visual, the Attack Path Meta-Element 613 for Groups 622 is expanded to showcase all contained Groups 622 and their corresponding Attack Path Edges 640.

Figure 19:
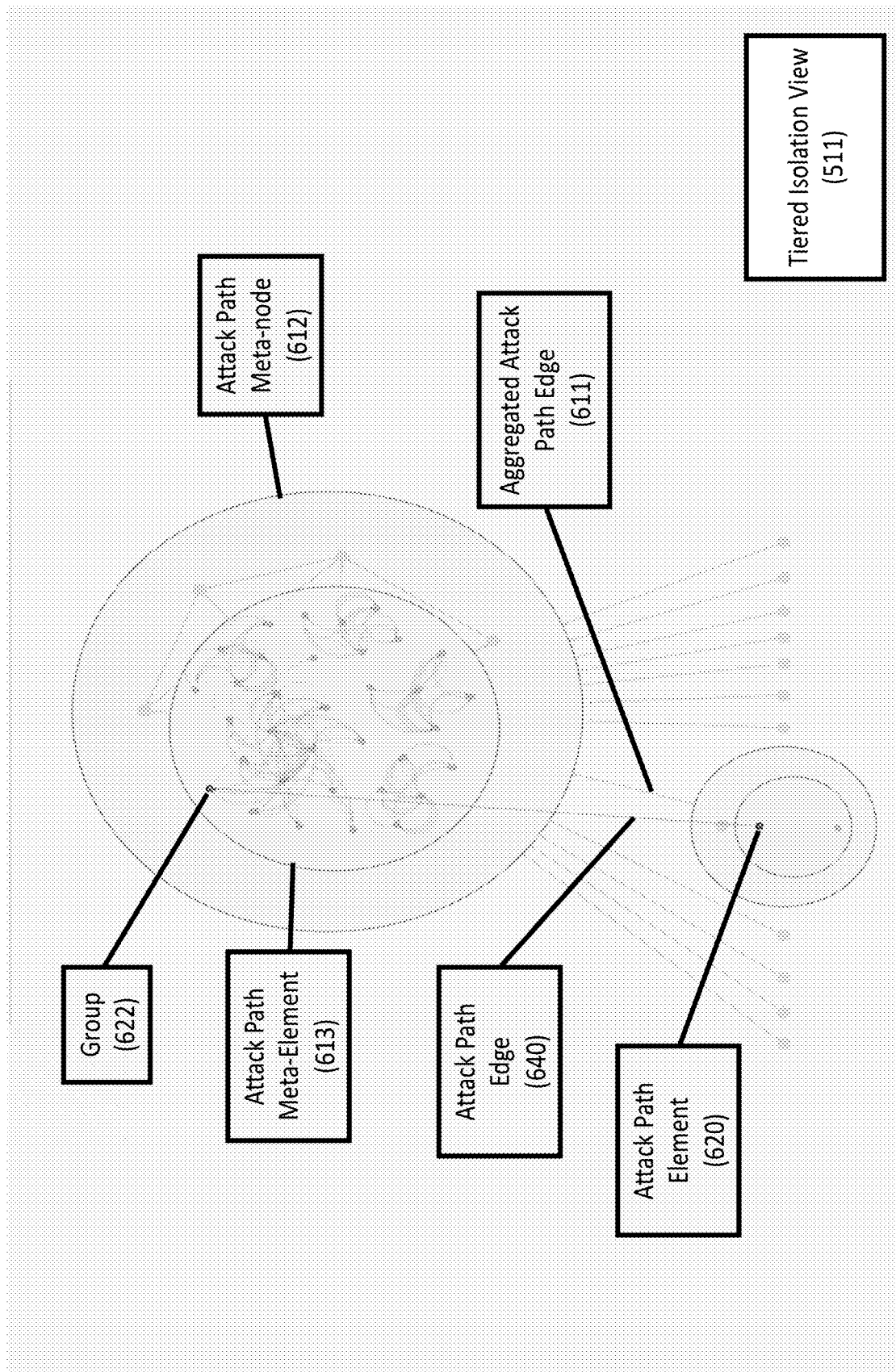
FIG. 19 illustrates an in-depth view of the objects within the Attack Graph.

FIG. 19 illustrates an in-depth view of the objects within the Attack Graph. Here, the Attack Path Meta-Node 612 for Tier 0 assets at the top of the graphic is expanded to reveal the Attack Path Meta-Elements 613 contained within. The Attack Path Meta-Element 613 for groups is expanded and an individual Group 622 is highlighted. This Group 622 is connected to another Attack Path Element 620 from the Tier 1 assets layer by an Attack Path Edge 640. This Attack Path Element 620 is itself another Group 622. This interface is allowing the user to start first with an overview of all aggregated elements before inspecting individual connections and moving to mitigation and remediation.

Attack Path Chock Point Identification Embodiment

Figure 22:
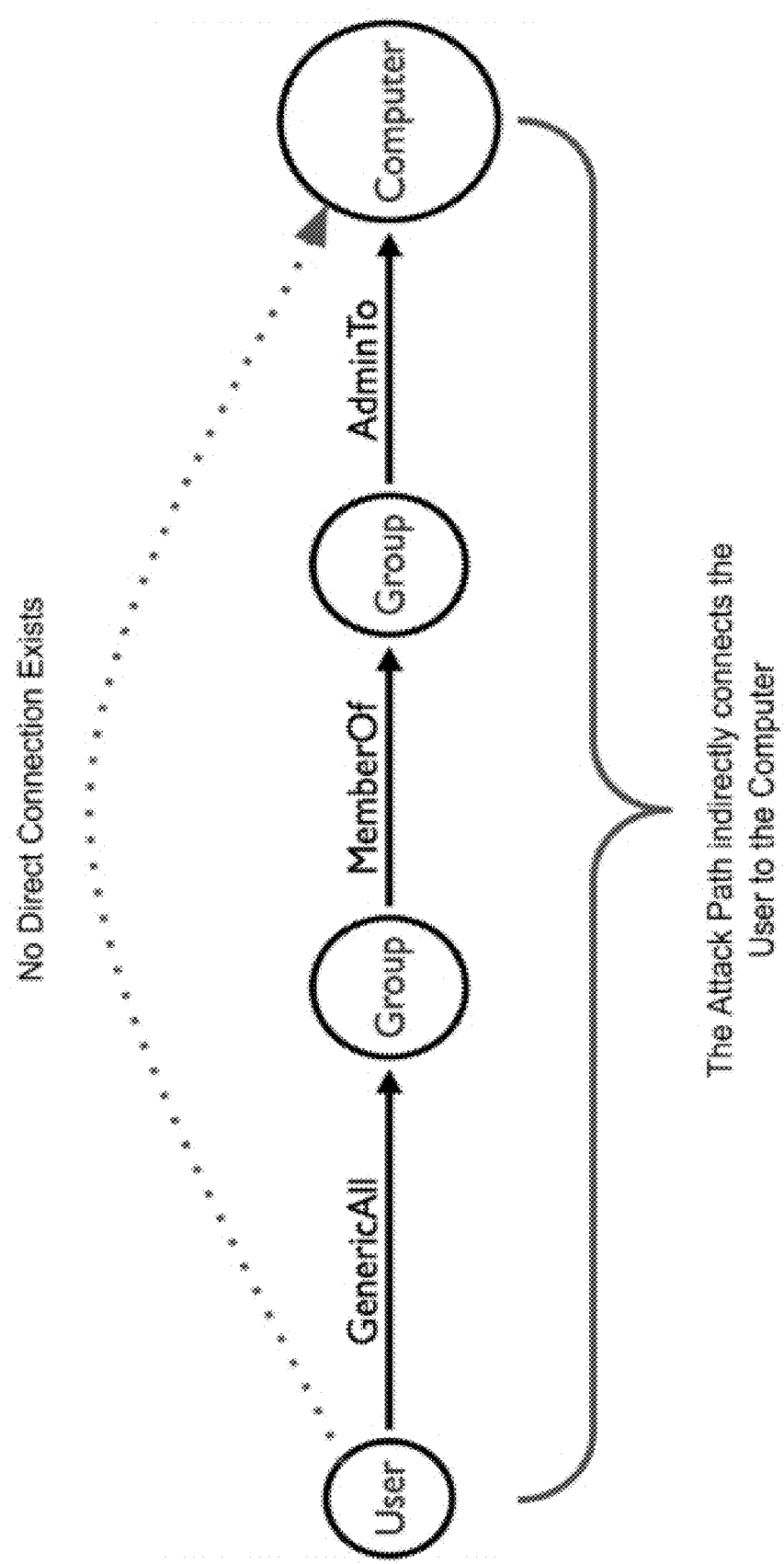
FIG. 22 illustrates an example of an indirect attack path.

Organizations trying to secure their critical directory services assets (i.e. "Tier Zero" or "Control Plane"—See docs.microsoft.com/en-us/security/compass/privileged-access-access-model for further details that is incorporated herein by reference) are commonly overwhelmed controlling the numerous amounts of Identity-Based Attack Paths (referred to herein simply as Attack Paths) within their environment. Attack Paths are the chains of abusable privileges and user behaviors that create direct and indirect connections between computers and users. For example, an indirect attack path is shown in FIG. 22 that indirectly connects the user to the computer and thus forms an attack path.

Like protecting Manhattan as discussed above, there are quite simply too many Attack Paths to action in even a relatively small IT infrastructure with 1,000 users. It would thus be desirable to provide a feature or system or method that can prioritize these attack paths (as discussed above in connection with the protecting Manhattan example) does not exist in current or conventional systems and methods.

Currently most security tools prioritize their vulnerability alerts based on industry expertise. This can include how easy the vulnerability is to exploit, whether there are tools available to exploit the vulnerability, how much access the vulnerability grants once exploited, etc. For Directory Services, this same knowledge is applied to vulnerable configurations and exposed credentials, for example. Each configuration is identified as a single "object" and that "object" is provided a severity rating like common vulnerability severity ratings. This embodiment of the system can identify Attack Path "Choke Points" or specific misconfigurations that grant the most exposure to the rest of the environment. Thus, this embodiment addresses a technical access control problem to assets and provides a technical solution using graph databases and a novel search process that helps security team prioritize their remediations by tackling the Attack Paths that grant the most access first.

Figure 23:
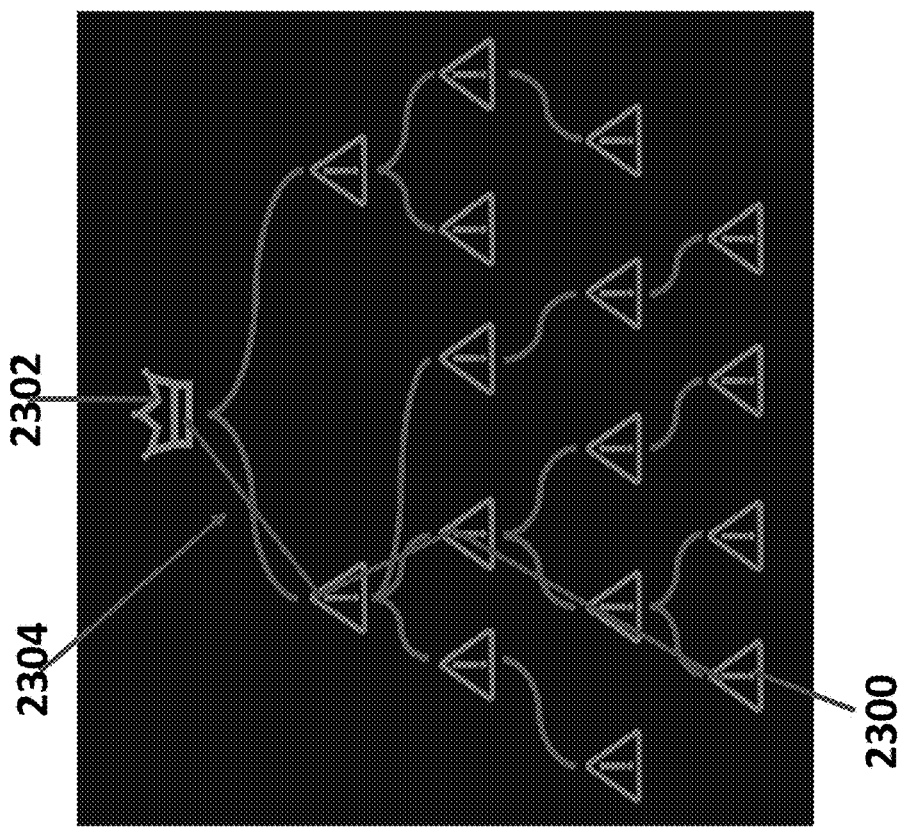
FIGS. 23 and 24 illustrates a computer network and its assets (including a Tier 0 resource) and access paths in a computer network and possible attack path choke points, respectively.

FIG. 23 illustrates a very simplified network with a plurality of assets (each shown as a triangle), a Tier 0 critical asset (shown as a crown) and the access paths (shown as lines between the assets and the Tier 0 asset) connecting the Tier 0 asset to the other assets and connecting the other assets to further assets. The graph shown in FIG. 23 may be generated by the attack path system and method discussed above that maps all Attack Paths down from Critical Directory Services assets using every misconfiguration within the environment.

Figure 24:
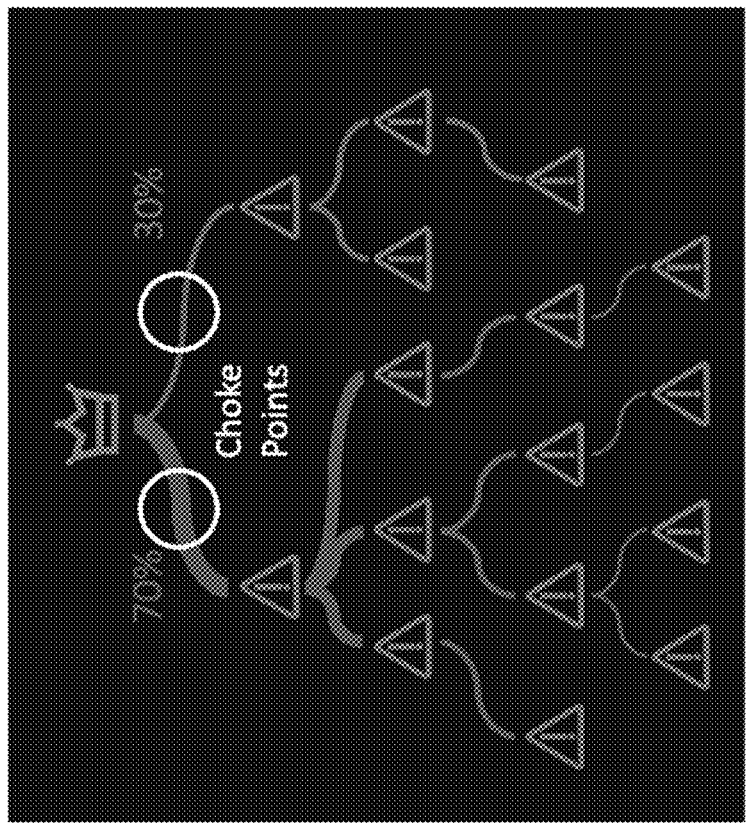

In the example in FIG. 23, each attack path 2304 from an asset 2300 to a Tier 0 (critical directory services) asset 2302 are mapped. However, as shown in FIG. 23, even for the very simple example, there are a significant number of possible attack paths. Thus, as shown in FIG. 24, this embodiment of the system and method can identify one or more critical choke points (circled in FIG. 24) to Critical Directory Services assets. Each choke point provides a direct path to the Critical Directory Services asset which means that, if that portion of the attack path is secure (for example without any misconfigurations) then no asset is able to access and attack the Critical Directory Services asset which is the technical benefit of this embodiment of the system.

Figure 26:
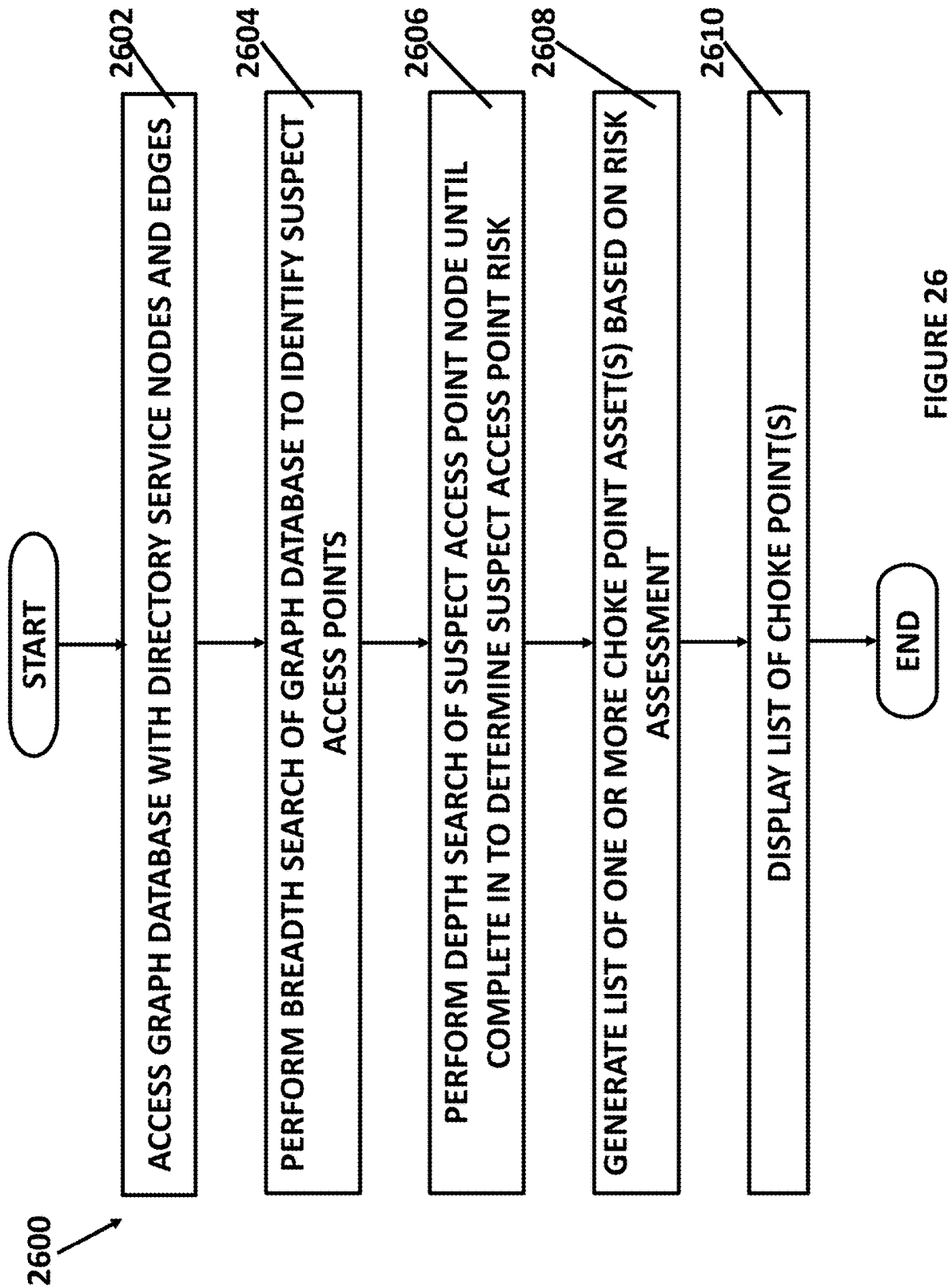
FIG. 26 shows the optimal chock point that is identified by the method in FIG. 25.

FIG. 26 is a flowchart of a method 2600 for determining one or more optimal chock points in a computer network. The method starts with a stored set of directory service nodes/assets and edges that were generated by the attack path identification system described above and there stored in the graph database. The method 2600 in FIG. 26 may be performed by the attack path determining system 411 in FIG. 4 (in which a processor is configured to perform the processes in FIG. 26 by executing instructions), it may be performed by a separate computer system having a processor that has access to the graph database 430 of the system 411 or is may be implemented in a hardware device or circuit that performs the processes.

The method may begin by accessing and retrieving attack path data (2602) from the graph database for a network. The method may then perform a breadth search (2604) of the graph database to identify suspect access points (choke points) such as the two choke points identified in the simple example in FIG. 24. Each of the suspect access points is a direct path to the Tier 0 (critical directory services asset) as shown in FIG. 24. It should be noted that in a much more complex computer network, this process 2604 may identify hundreds or thousands of suspect access points.

Once the suspect access points are determined, each suspect access point is searched further (2606). The search process avoids unnecessary time-cost complexity often seen in analyzing highly interconnected networks by traversing through the suspect access point subgraphs only once.

In the search process, a dependency graph is built for each of the other assets that can possibly access the Tier 0 (critical directory services asset). Using the dependency information stored, the system can analyze the suspect access points to determine exactly how much of the environment can utilize each suspect access point to attack critical Directory Services assets. For each suspect access point (generally the asset that connects directly to the Tier 0 (critical directory services asset), the search is performed until completion. The system will avoid re-traversal of heavy paths by checking for an existing reference to the stored dependency graph of each asset. If a preexisting reference is found a shortcut to the reference is recorded and further traversal of the path halts. Once all searches are complete, these references are then compiled in dependency order to procure access cardinality for each asset traversed. Thus, as shown in the simple example in FIG. 24, one suspect access point allows 70% of the assets to possibly attack the Tier 0 (critical directory services asset) asset while the other suspect access point allows 30% (a predetermined number of the assets equal to 30%) of the assets to possibly attack the Tier 0 (critical directory services asset) asset. Thus, the method may then generate a list of the one or more suspect access points and their risk assessment percentage number. As a result of the processes, the method may then identify and list the suspect access points with the highest risk assessment as the one or more choke points (2610). In the simple example shown in FIG. 25, the choke point with the 70% percent risk assessment is selected. This selection of the highest risk choke points allows an administrator of the computer network to easily see and focus security efforts on those highest risk choke points first. Furthermore, it is possible that the method in FIG. 26 could reveal as yet unknown choke point with a high risk assessment that was not previously known to the administrator.

Figure 25:
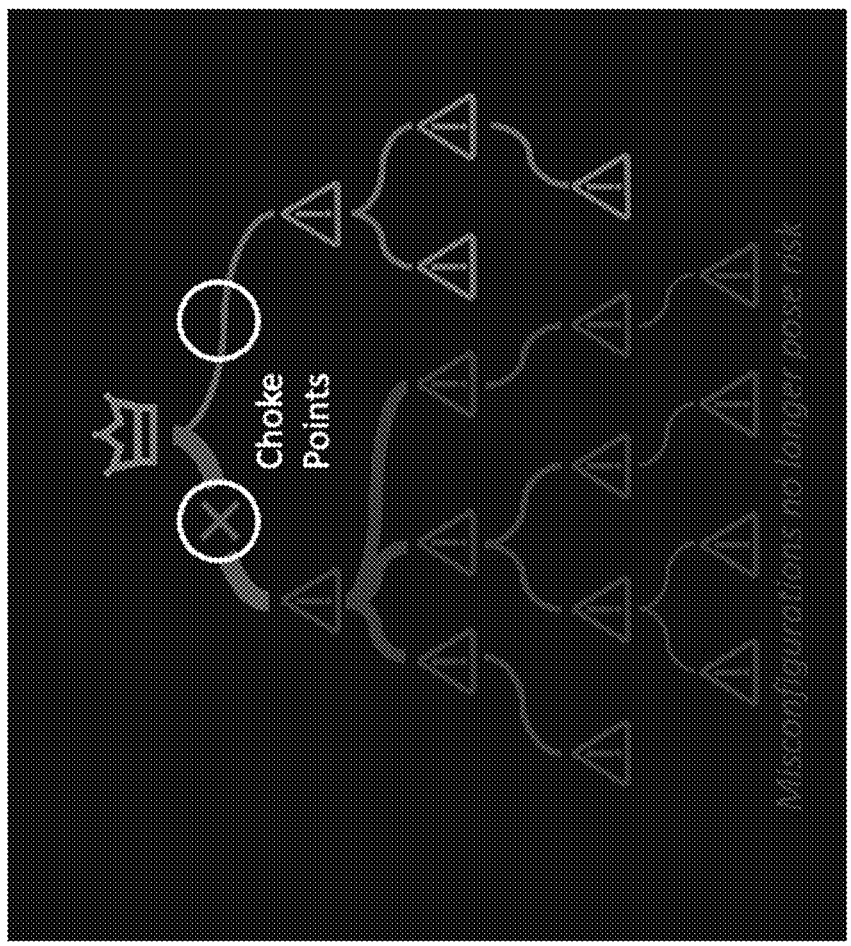
FIG. 25 is a flowchart of a method for determining one or more optimal chock points in a computer network.

This choke point determining method and system then demonstrates how a team in charge of security of the network can sever a large concentration of Attack Paths by focusing on the most severe Attack Path/misconfiguration first. Once the choke point access is resolved, the misconfigurations of assets connected to the choke point no longer poses a risk of an attack as shown in FIG. 25. The system and method calculates the percentage of users and computers within the environment that can utilize any given Attack Path into critical Directory Services Assets. It also does this continuously so new Attack Paths, or more exposure granted to existing Attack Paths, are taken into account thereby allowing security teams to constantly prioritize which Attack Path to remediate first and with better clarity on the risk reduction provided by severing any specific Attack Path.

Figure 27:
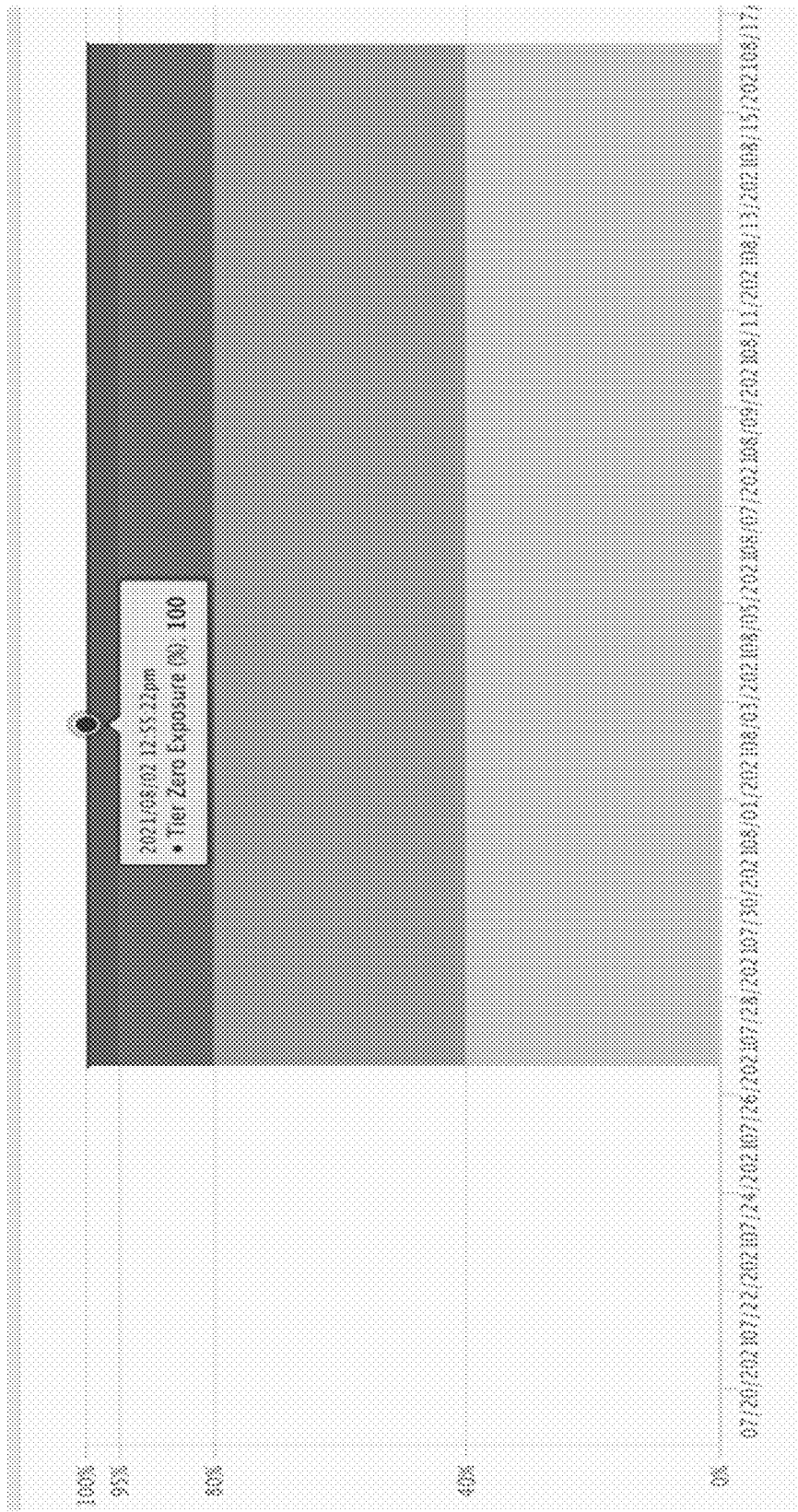
FIG. 27 illustrates a data visualization user interface generated based on the identified one or more chock points.

This embodiment of the system can quantify the overall risk exposure of all Directory Services assets as a single metric (such as a score, a number or a percentage of risk as shown in FIG. 27). Thus, rather than focus on number of active alerts/vulnerabilities in the environment like typical systems, the system continuously assesses how many assets in the environment have the ability to compromise critical Directory Services assets using any available Attack Path. In using the map analogy above, imagine measuring the percentage of the country that can attack the Island of Manhattan using any available bridge. The system uses a novel process to measure how much of the environment can be used to attack critical Directory Services assets using any available Attack Path as shown in FIG. 27. As shown, the assets with a 95% risk assessment have the highest risk assessment percentage and the system categories the risk assessments. This provides organizations with an empirical measurement of the Directory Services security posture that is beyond simply counting the number of active "issues/alerts/vulnerabilities/etc.". This metric can also be used to track remediations. As organizations remediate individual Attack Paths, this metric will also fall as less of the environment has the ability to attack critical assets.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. An apparatus for analyzing choke points in a directory services system, the apparatus comprising:
    a graph database that stores one or more continuously collected directory services data for one or more assets in a data center of an infrastructure of an enterprise that uses the directory services system to manage access permissions of the one or more assets to a critical directory services asset;
    a computer system having a processor that executes a plurality of lines of instructions that configures the computer system to:
        access the one or more continuously collected directory services data from the graph database;
        perform a breadth search of the continuously collected directory services data to identify one or more choke points, wherein each choke points is an asset that has direct access to the critical directory services asset;
        perform, for each particular choke points, a depth based search to determine a quantity of assets within an environment that are able to access the critical directory services asset using the particular choke point;
        determine one or more choke points from the breadth and depth based searches;
        build a dependency graph for each asset that can access Tier 0 critical directory services assets of the determined choke points, wherein the Tier 0 critical directory services assets represents highly critical assets and users within the environment;
        perform a subsequent search using the dependency graph and if a preexisting reference is found, a shortcut to the preexisting reference is recorded;
        identify one or more choke points based on the recorded preexisting reference; and
        reidentify the one or more choke points in response to a modification of the directory services system.

2. The apparatus of claim 1 wherein the computer system is further configured to,
    analyze, using the dependency graph, the choke points to determine how much of the environment can utilize each of the determined suspect access points to attack critical Directory Services assets.

3. The apparatus of claim 2 wherein the computer system is further configured to,
    continue the search using the dependency graph until completion, for each of the determined suspect access points that are connected to Tier 0 critical directory services assets.

4. The apparatus of claim 1 wherein the computer system is further configured to,
    compile references in dependency order to procure access cardinality for each traversed asset.

5. The apparatus of claim 4 wherein the computer system is further configured to,
    generate a list of the one or more determined suspect access points and a risk assessment percentage number using the cardinality for each traversed asset.

6. The apparatus of claim 5 wherein the computer system is further configured to,
    identify and list the suspect access points with a highest risk assessment percentage as the one or more choke points.

7. The apparatus of claim 1, wherein the directory services system is one of a distributed directory services system.

8. The apparatus of claim 1, wherein the one or more assets further comprises a domain controller, a domain computer and a security information and event system.

* * * * *